United States Patent [19]
Fenelon

[11] Patent Number: 5,956,998
[45] Date of Patent: Sep. 28, 1999

[54] STRESS REDUCTION GEAR AND APPARATUS USING SAME

[76] Inventor: Paul J. Fenelon, 13 Inverary, Nashville, Tenn. 37215

[21] Appl. No.: 08/986,221

[22] Filed: Dec. 5, 1997

Related U.S. Application Data

[63] Continuation of application No. PCT/US96/09191, Jun. 6, 1996.

[51] Int. Cl.[6] ............................ F16H 19/04; F16H 55/14; F16D 3/50
[52] U.S. Cl. ............................. 74/89.17; 74/411; 74/425; 292/144; 292/DIG. 62; 464/75
[58] Field of Search ................................... 74/89.17, 411, 74/425; 292/144, 201, DIG. 62; 464/74, 75; F16H 19/04, 55/14; F16D 3/50

[56] References Cited

U.S. PATENT DOCUMENTS

| Re. 34,105 | 10/1992 | Flotow et al. . |
|---|---|---|
| 284,290 | 9/1883 | Gilliland . |
| 287,711 | 10/1883 | Ortman . |
| 288,134 | 11/1883 | Stone, Jr. . |
| 312,780 | 2/1885 | Wilcox . |

(List continued on next page.)

FOREIGN PATENT DOCUMENTS

| 478412 | 7/1949 | Belgium . |
|---|---|---|
| 1380509 | 10/1964 | France . |
| 3197232 | 8/1991 | Japan . |
| 4282053 | 10/1992 | Japan . |
| 175429 | 2/1922 | United Kingdom . |
| 682196 | 11/1952 | United Kingdom . |
| 759215 | 10/1956 | United Kingdom . |
| 792330 | 3/1958 | United Kingdom . |
| 989898 | 4/1965 | United Kingdom . |
| WO9418476 | 8/1994 | WIPO . |
| WO9609191 | 5/1997 | WIPO . |

OTHER PUBLICATIONS

Machine Design—Basics of Design Engineering, "Components for drivelines", Jun. 1992, pp. 92–96.
le;.5qPhotographs of sunroof motor, Exhibits A–L (prior to Jun. 7, 1995).
Photographs of window lift motor having three elastomeric inserts (prior to Dec. 1, 1993) (No. 2).
Photographs of window lift motor having a rim, web, hub and elastomeric material (prior to Dec. 1, 1993) (No. 3).
European Search Report dated Jun. 9, 1997, 1 page.

*Primary Examiner*—Allan D. Herrmann
*Attorney, Agent, or Firm*—Harness, Dickey & Pierce, P.L.C.

[57] ABSTRACT

A rotatable apparatus includes a pair of rotatable members joined by a stress dissipating structure. The stress dissipating structure can be employed in a gear, sprocket, clutch or the like. In one embodiment of the present invention, anti-buckling plates generally spanning between a hub and rim define a hollow cavity. In another embodiment of the present invention, the stress dissipating structure includes a specifically configured sets of nodules moving the hub and rim. An additional aspect of the present invention provides a stress dissipating structure employing various anti-buckling plate attachment constructions. In still another embodiment of the present invention, a uniquely sized and packaged gear, gear housing and/or motor are employed in order to maximize output force per pound of material efficiencies. Another embodiment employs a stress dissipation member in a door lock mechanism.

18 Claims, 23 Drawing Sheets

U.S. PATENT DOCUMENTS

| | | |
|---|---|---|
| 314,472 | 3/1885 | Plamondon . |
| 379,022 | 3/1888 | Morgan . |
| 680,654 | 8/1901 | Gomber . |
| 820,789 | 5/1906 | Hutchins . |
| 1,060,865 | 5/1913 | Sundh . |
| 1,265,811 | 5/1918 | Ohlson . |
| 1,424,203 | 8/1922 | Keller . |
| 1,674,226 | 6/1928 | Reed . |
| 1,750,827 | 3/1930 | Wemp . |
| 1,757,517 | 5/1930 | Eaton . |
| 1,780,727 | 11/1930 | Tenney . |
| 1,913,525 | 6/1933 | Valentine et al. . |
| 1,925,278 | 9/1933 | Paton . |
| 1,928,763 | 10/1933 | Rosenberg . |
| 1,967,322 | 7/1934 | Pearmain . |
| 2,004,712 | 6/1935 | Thiry . |
| 2,049,133 | 7/1936 | Pierce . |
| 2,105,188 | 1/1938 | Guy . |
| 2,118,913 | 5/1938 | Bachman . |
| 2,157,211 | 5/1939 | McDonald . |
| 2,162,071 | 6/1939 | Eason . |
| 2,182,387 | 12/1939 | Probst . |
| 2,187,706 | 1/1940 | Julien . |
| 2,260,869 | 10/1941 | Ruesenberg . |
| 2,301,600 | 11/1942 | Wilson . |
| 2,306,539 | 12/1942 | Jones . |
| 2,307,129 | 1/1943 | Hines et al. . |
| 2,325,193 | 7/1943 | Nutt et al. . |
| 2,380,776 | 7/1945 | Miller . |
| 2,400,586 | 5/1946 | Zimmermann . |
| 2,460,630 | 2/1949 | Fawick . |
| 2,560,644 | 7/1951 | Hartzell . |
| 2,591,734 | 4/1952 | Smith et al. . |
| 2,702,995 | 3/1955 | Biedess . |
| 2,753,731 | 7/1956 | McWethy . |
| 2,857,777 | 10/1958 | Porter . |
| 2,869,388 | 1/1959 | Kreis . |
| 2,904,150 | 9/1959 | Sand . |
| 2,939,331 | 6/1960 | Weeks . |
| 2,955,481 | 10/1960 | Jackel . |
| 2,956,187 | 10/1960 | Wood . |
| 2,961,856 | 11/1960 | Selzer . |
| 2,998,114 | 8/1961 | Altmann . |
| 3,020,036 | 2/1962 | Kleinschmidt . |
| 3,057,220 | 10/1962 | Parr . |
| 3,071,850 | 1/1963 | Haushalter . |
| 3,076,352 | 2/1963 | Larsh . |
| 3,078,206 | 2/1963 | Skura . |
| 3,167,975 | 2/1965 | Durand . |
| 3,171,270 | 3/1965 | Dahlberg . |
| 3,216,267 | 11/1965 | Dolza . |
| 3,218,828 | 11/1965 | Thelander . |
| 3,223,214 | 12/1965 | Kuivinen . |
| 3,236,347 | 2/1966 | Puls et al. . |
| 3,245,508 | 4/1966 | Livezey . |
| 3,257,860 | 6/1966 | Runde et al. . |
| 3,265,172 | 8/1966 | Atsumi et al. . |
| 3,283,864 | 11/1966 | Motsch . |
| 3,304,795 | 2/1967 | Rouverol . |
| 3,323,624 | 6/1967 | Maurice . |
| 3,360,998 | 1/1968 | Griffel . |
| 3,362,256 | 1/1968 | Cluff et al. . |
| 3,375,911 | 4/1968 | Smirl . |
| 3,406,583 | 10/1968 | Baier . |
| 3,428,155 | 2/1969 | Binder et al. . |
| 3,557,573 | 1/1971 | Hansgen . |
| 3,557,633 | 1/1971 | Frerichs . |
| 3,565,223 | 2/1971 | Pierce . |
| 3,628,353 | 12/1971 | Armstrong . |
| 3,640,363 | 2/1972 | Spalding . |
| 3,667,317 | 6/1972 | Hillingrathner . |
| 3,757,608 | 9/1973 | Willner . |
| 3,770,088 | 11/1973 | Shono . |
| 3,791,499 | 2/1974 | Ryan . |
| 3,885,657 | 5/1975 | Sato . |
| 3,930,339 | 1/1976 | Jander . |
| 3,943,788 | 3/1976 | Kummel et al. . |
| 3,952,546 | 4/1976 | Nakano et al. . |
| 4,004,669 | 1/1977 | Roderick . |
| 4,178,811 | 12/1979 | Shepherd . |
| 4,184,578 | 1/1980 | Moore et al. . |
| 4,222,202 | 9/1980 | Pigeon . |
| 4,241,818 | 12/1980 | Miller . |
| 4,296,851 | 10/1981 | Pierce . |
| 4,296,853 | 10/1981 | Kronert . |
| 4,296,854 | 10/1981 | Staub, Jr. . |
| 4,300,670 | 11/1981 | Mathues . |
| 4,328,879 | 5/1982 | Tone . |
| 4,441,600 | 4/1984 | Caray . |
| 4,461,376 | 7/1984 | Lech, Jr. et al. . |
| 4,465,172 | 8/1984 | Gatewood . |
| 4,474,276 | 10/1984 | Loizeau . |
| 4,478,326 | 10/1984 | Rotter . |
| 4,511,186 | 4/1985 | Sasamoto . |
| 4,530,673 | 7/1985 | Lamarche . |
| 4,537,298 | 8/1985 | Loizeau . |
| 4,541,296 | 9/1985 | Oyafuso . |
| 4,549,642 | 10/1985 | Loizeau . |
| 4,552,543 | 11/1985 | Wolf et al. . |
| 4,558,773 | 12/1985 | Schafer . |
| 4,560,366 | 12/1985 | Loizeau . |
| 4,560,367 | 12/1985 | Wolf et al. . |
| 4,562,913 | 1/1986 | Cucinotta et al. . |
| 4,564,097 | 1/1986 | Kabayama . |
| 4,572,344 | 2/1986 | Horiuchi et al. . |
| 4,573,723 | 3/1986 | Morita et al. ............ 292/336.3 |
| 4,574,930 | 3/1986 | Koitabashi . |
| 4,591,040 | 5/1986 | Schraut et al. . |
| 4,606,451 | 8/1986 | Martinez-Corral et al. . |
| 4,609,088 | 9/1986 | Takeuchi . |
| 4,615,096 | 10/1986 | Foster . |
| 4,616,742 | 10/1986 | Matsushita . |
| 4,624,351 | 11/1986 | Lutz et al. . |
| 4,629,048 | 12/1986 | Draper et al. . |
| 4,632,235 | 12/1986 | Flotow et al. . |
| 4,635,779 | 1/1987 | Bacher et al. . |
| 4,635,780 | 1/1987 | Wiggen . |
| 4,638,684 | 1/1987 | Maucher . |
| 4,646,899 | 3/1987 | Murakami . |
| 4,674,351 | 6/1987 | Byrd . |
| 4,680,979 | 7/1987 | Morishita et al. . |
| 4,693,354 | 9/1987 | Umeyama et al. . |
| 4,696,384 | 9/1987 | Huber . |
| 4,706,512 | 11/1987 | McKernon et al. ............... 74/411 X |
| 4,709,796 | 12/1987 | Uenohara . |
| 4,729,464 | 3/1988 | Friedmann . |
| 4,732,250 | 3/1988 | Maucher et al. . |
| 4,741,420 | 5/1988 | Fujito et al. . |
| 4,744,448 | 5/1988 | Maycock et al. . |
| 4,760,906 | 8/1988 | Flotow et al. . |
| 4,764,152 | 8/1988 | Jorg et al. . |
| 4,793,455 | 12/1988 | Tabuchi et al. . |
| 4,796,728 | 1/1989 | Kanengieter et al. . |
| 4,846,323 | 7/1989 | Fukushima . |
| 4,891,033 | 1/1990 | Heyser . |
| 4,892,008 | 1/1990 | Naudin et al. . |
| 4,899,862 | 2/1990 | Graton et al. . |
| 4,913,275 | 4/1990 | Kobayashi et al. . |
| 4,919,246 | 4/1990 | Gay et al. . |
| 4,938,729 | 7/1990 | Hamada et al. . |
| 4,951,515 | 8/1990 | Morishita et al. . |
| 4,972,734 | 11/1990 | Hyodo et al. . |

| | | |
|---|---|---|
| 4,987,987 | 1/1991 | Damon et al. . |
| 4,996,892 | 3/1991 | Yamamoto . |
| 5,032,107 | 7/1991 | Umeyama et al. . |
| 5,052,244 | 10/1991 | Kamiya et al. . |
| 5,062,517 | 11/1991 | Muchmore et al. . |
| 5,064,041 | 11/1991 | Graton et al. . |
| 5,064,042 | 11/1991 | Kuhne et al. . |
| 5,067,602 | 11/1991 | Flotow et al. . |
| 5,088,964 | 2/1992 | Kuhne . |
| 5,090,543 | 2/1992 | Takeuchi . |
| 5,113,713 | 5/1992 | Isabelle et al. . |
| 5,127,279 | 7/1992 | Barthruff . |
| 5,135,089 | 8/1992 | Kovac . |
| 5,138,902 | 8/1992 | Muller et al. . |
| 5,139,122 | 8/1992 | Maeda et al. . |
| 5,146,811 | 9/1992 | Jackel . |
| 5,147,246 | 9/1992 | Focqueur et al. . |
| 5,158,508 | 10/1992 | Sakaguchi et al. . |
| 5,161,660 | 11/1992 | Huber . |
| 5,169,357 | 12/1992 | Graton . |
| 5,186,077 | 2/1993 | Nakane . |
| 5,195,625 | 3/1993 | Chang et al. . |
| 5,201,394 | 4/1993 | Suzuki . |
| 5,203,835 | 4/1993 | Kohno et al. . |
| 5,205,389 | 4/1993 | Raab et al. . |
| 5,209,139 | 5/1993 | Janiszewski . |
| 5,209,330 | 5/1993 | Macdonald . |
| 5,209,334 | 5/1993 | Fischer et al. . |
| 5,213,188 | 5/1993 | Feser et al. . |
| 5,217,409 | 6/1993 | Dalbiez . |
| 5,218,884 | 6/1993 | Rohrle . |
| 5,226,259 | 7/1993 | Yamagata et al. . |
| 5,230,409 | 7/1993 | Tanaka et al. . |
| 5,230,415 | 7/1993 | Ament et al. . |
| 5,240,458 | 8/1993 | Linglain et al. . |
| 5,245,889 | 9/1993 | Kohno et al. . |
| 5,246,398 | 9/1993 | Birk et al. . |
| 5,246,399 | 9/1993 | Yanko et al. . |
| 5,255,470 | 10/1993 | Dupuy . |
| 5,255,761 | 10/1993 | Zaremsky . |
| 5,257,687 | 11/1993 | Cooke . |
| 5,261,517 | 11/1993 | Hering . |
| 5,269,725 | 12/1993 | Maucher et al. . |
| 5,273,145 | 12/1993 | Corral et al. . |
| 5,279,398 | 1/1994 | Graton et al. . |
| 5,289,737 | 3/1994 | Kuhne . |
| 5,293,978 | 3/1994 | Reik et al. . |
| 5,307,705 | 5/1994 | Fenelon . |
| 5,308,282 | 5/1994 | Hansen et al. . |
| 5,310,025 | 5/1994 | Anderson . |
| 5,314,051 | 5/1994 | Marie et al. . |
| 5,318,478 | 6/1994 | Khune et al. . |
| 5,322,149 | 6/1994 | Szadkowski . |
| 5,322,474 | 6/1994 | Hashimoto et al. . |
| 5,333,713 | 8/1994 | Hagnere et al. . |
| 5,349,883 | 9/1994 | Reik et al. . |
| 5,351,443 | 10/1994 | Kimura et al. . |
| 5,352,156 | 10/1994 | Klein et al. . |
| 5,360,090 | 11/1994 | Stretch et al. . |
| 5,440,186 | 8/1995 | Forsell et al. . |
| 5,452,622 | 9/1995 | Fenelon . |
| 5,653,144 | 8/1997 | Fenelon . |
| 5,692,410 | 12/1997 | Fenelon . |

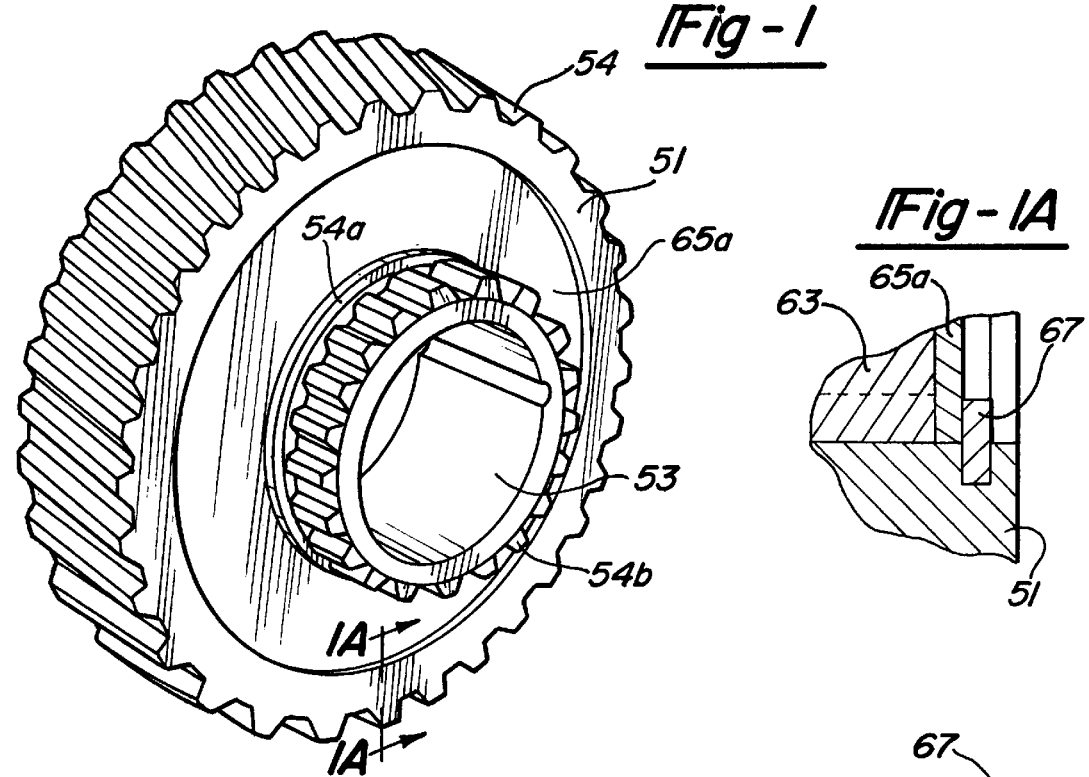
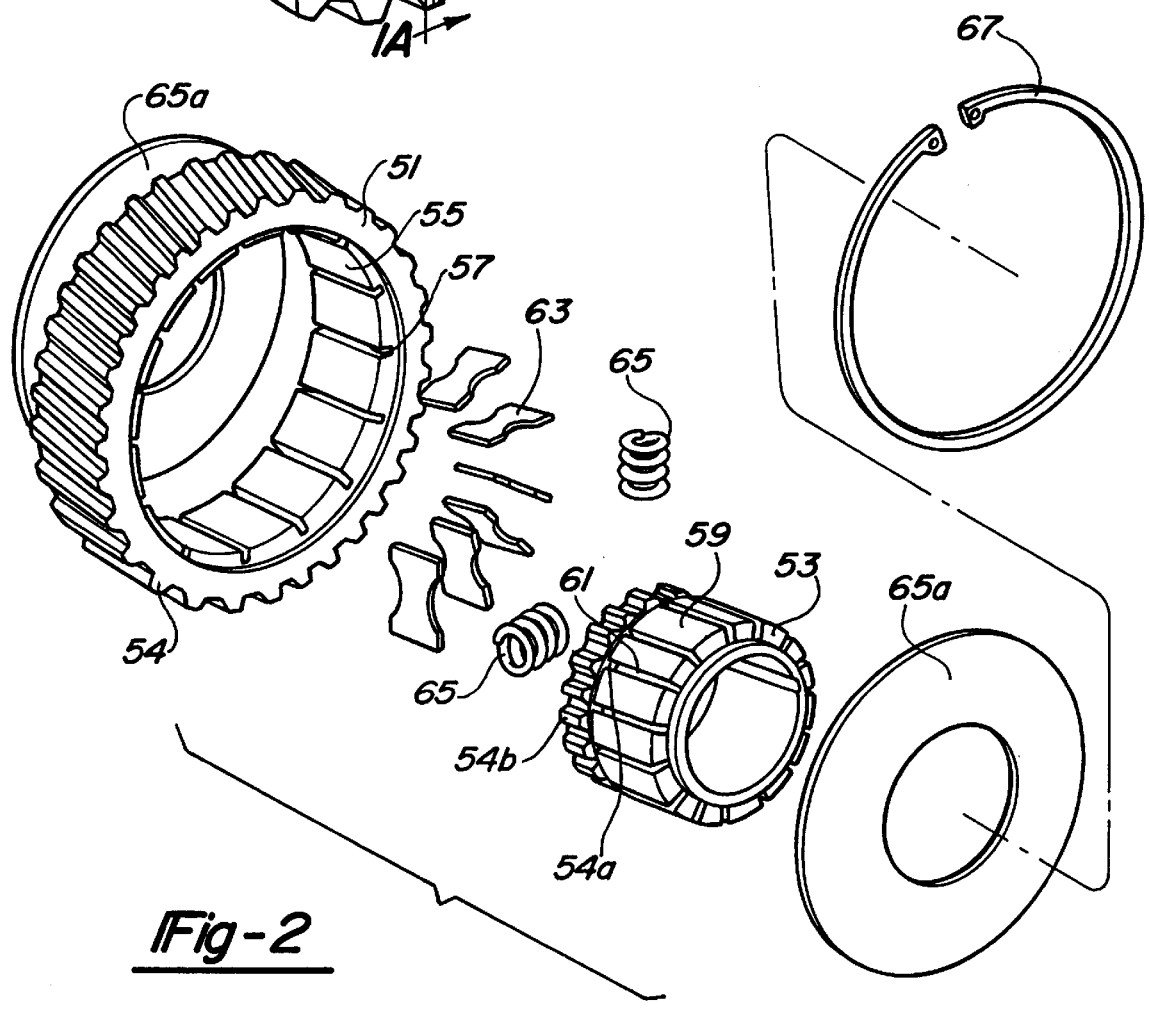

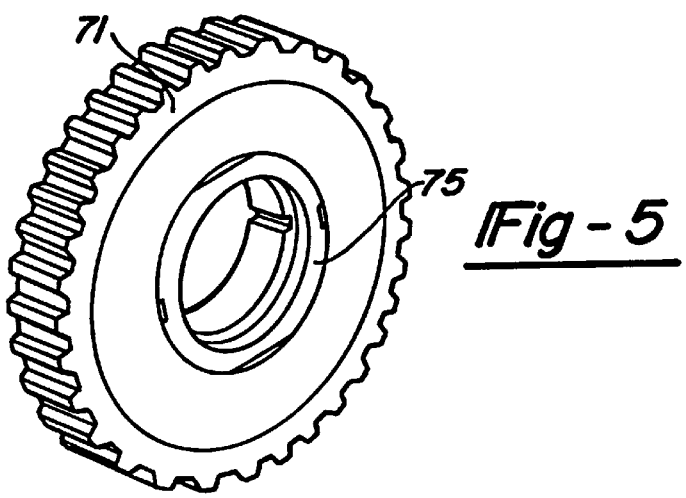
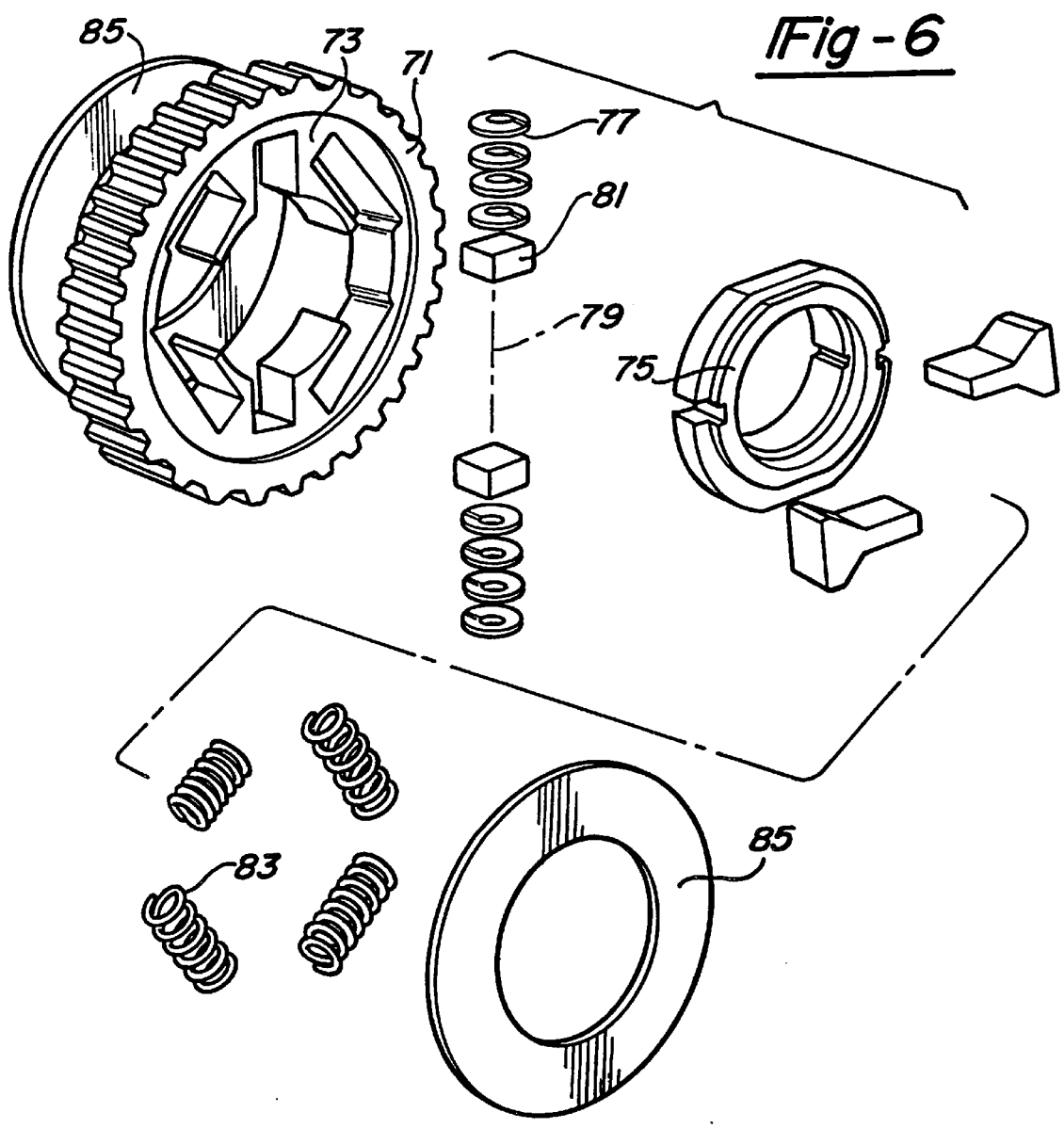

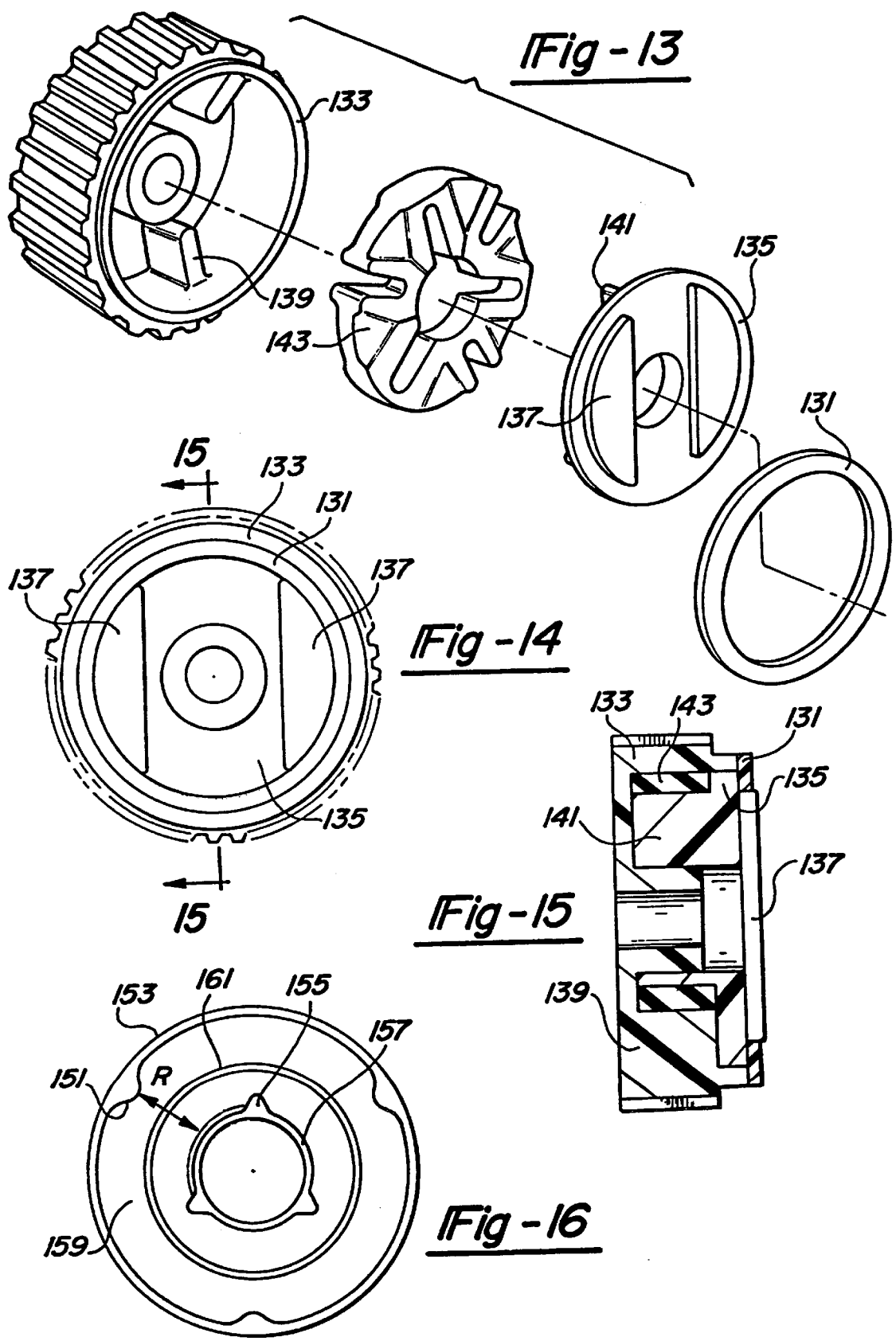

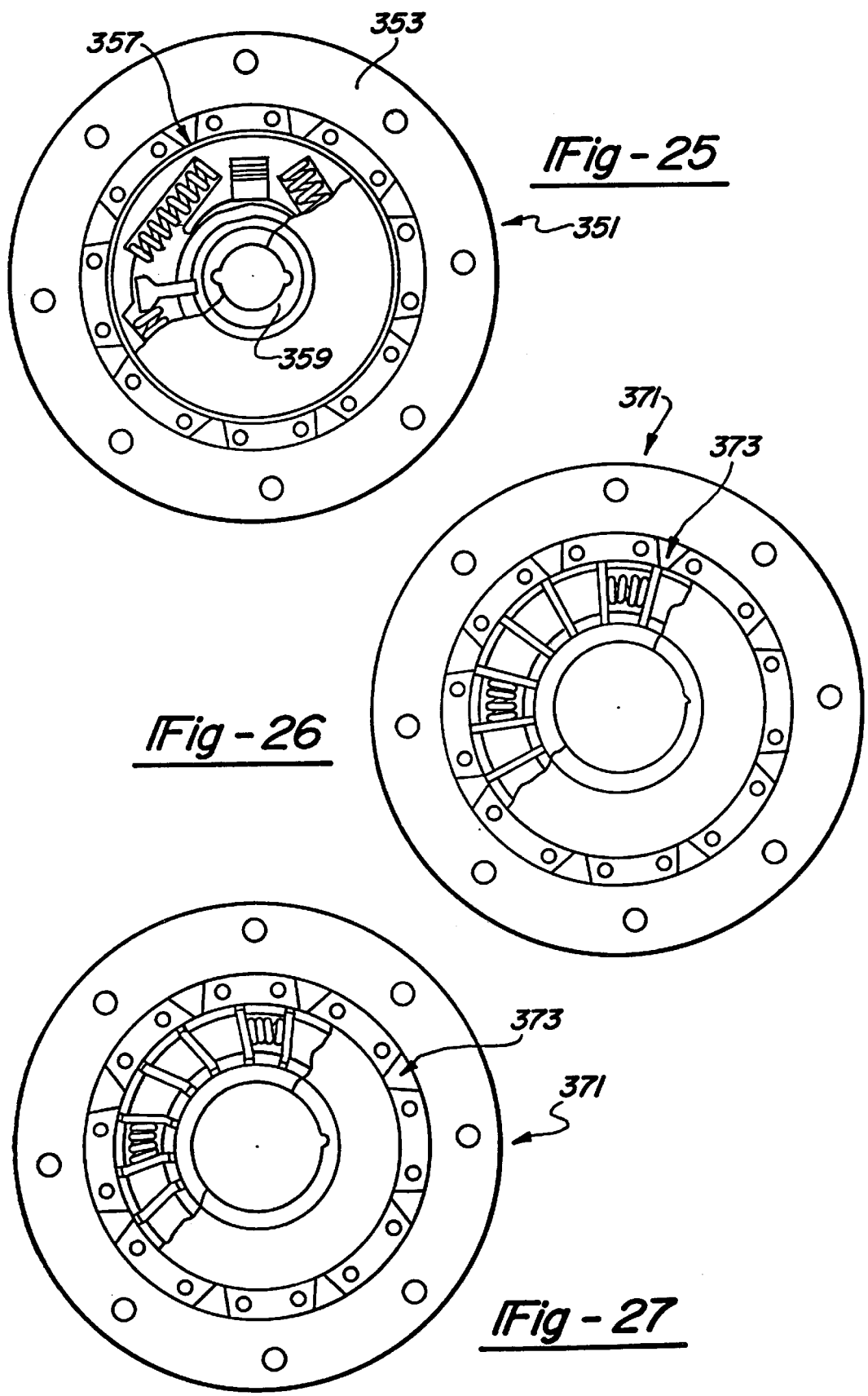

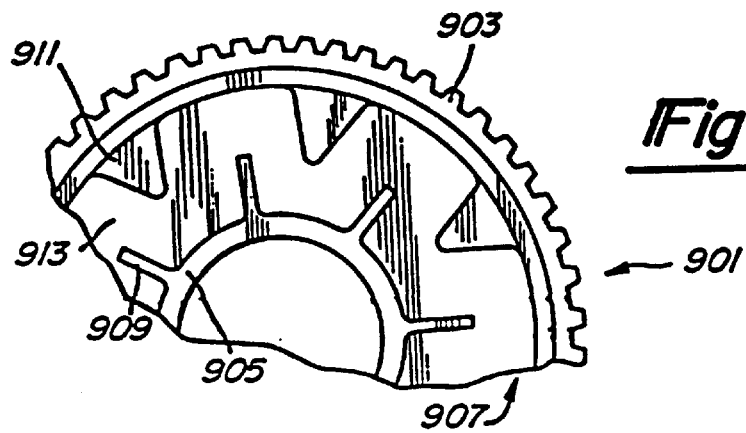
_Fig-36_
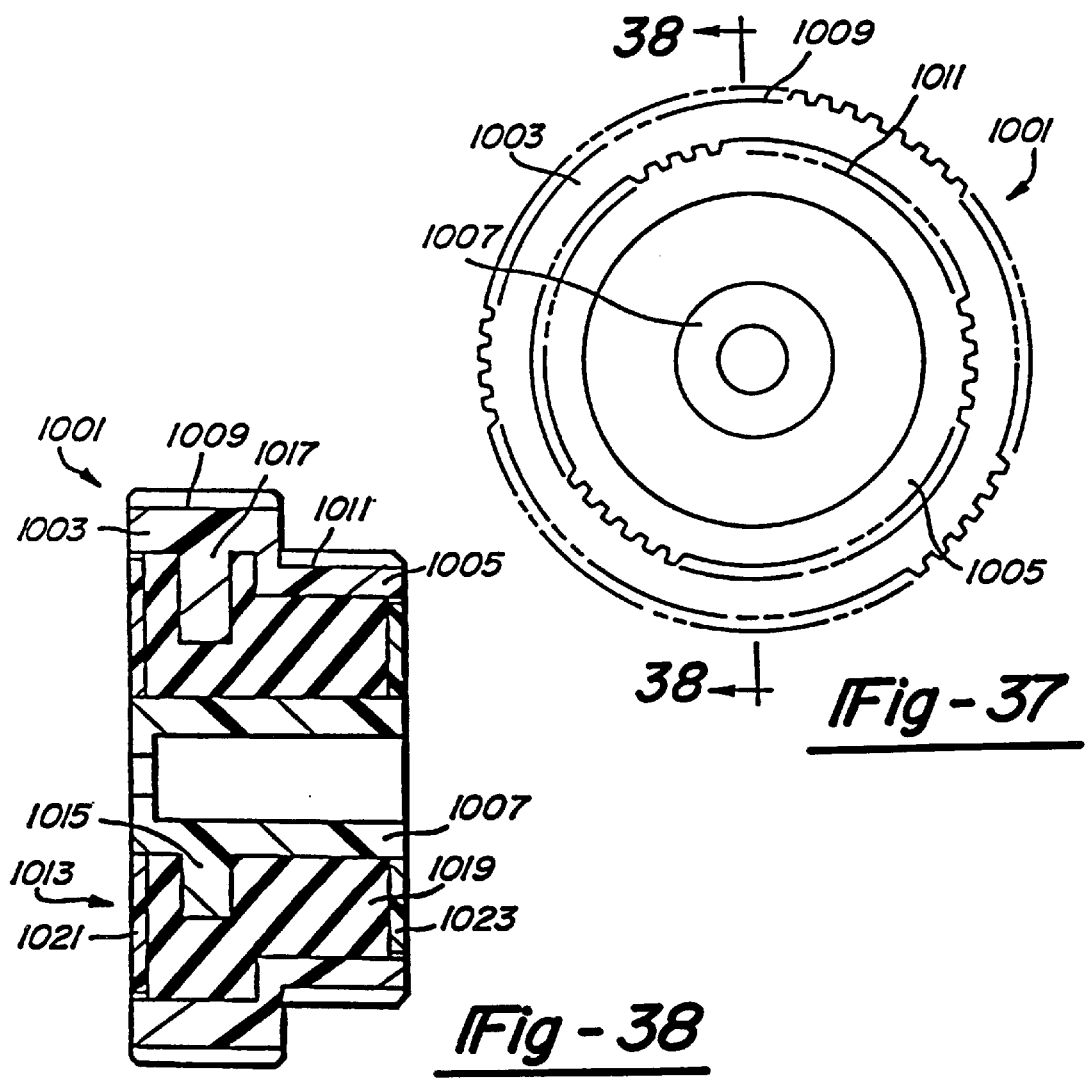
_Fig-37_
_Fig-38_

STRESS REDUCTION GEAR AND APPARATUS USING SAME

CROSS REFERENCE TO RELATED APPLICATIONS

This is a continuation of PCT Patent Application No. PCT/US96/09191, filed Jun. 6, 1996, designating the United States.

BACKGROUND OF THE INVENTION

This invention relates generally to rotatable apparatuses and specifically to a rotatable apparatus having a pair of rotatable members joined by a stress dissipating structure and apparatus using such a rotatable apparatus. The primary function of a gear is to transmit power from a power generating source to an operating device. This is achieved through the intermeshing and continuity of action between the teeth of a driving gear which is associated with the power source and the teeth of the mating gear which is associated with the operating device. Since a gear is a rotating body, a state of dynamic equilibrium must be attained. Therefore, to be in dynamic equilibrium all of the reactions from the rotating gear must be neutralized by equal and opposite forces supporting the gear shaft.

Traditional gear design comprises a central hub, a web extending radially outward therefrom which is, in turn, peripherally bordered by an integral radial rim having geared teeth thereupon. Gear failure can occur if manufacturing tolerances, material type, and gear design are not matched to the service application. Furthermore, since gears have historically been manufactured from a single homogeneous material, the bulk rigidity and strength of the web is generally greater than or equal to that of the hub and rim. Thus, torsional stresses created through start-up, shut-down, overload, or through cyclical fatigue are localized in the teeth and hub areas. As a result, gears typically fail at the root of the teeth or in the hub region. Such failures include excessive wear, plastic flow or creep, tooth bending fatigue, contact fatigue (pitting and spalling), thermal fatigue, tooth bending impact, tooth shear, tooth chipping, case crushing, torsional shear and stress ruptures. Many of these failures are due primarily to overload, cycling fatigue, and/or start-up and shut-down rotational shock referenced above that is especially prevalent in gears that perform in non-constant rotation service applications.

Additionally, most, if not all, motors and gears used in automotive window lift applications tend to be rather large in a transverse direction (i.e., perpendicular to the armature shaft rotational axis) primarily due to the inefficiently constructed conventional driven gear coupled thereto. This largeness in size adds to packaging problems within the doors thereby reducing occupant shoulder room. These motors also add unnecessary weight which adversely affects the vehicle's gas/mileage performance.

An alternative gear design that has been used is a compliant gear having a rigid one-piece hub and web, and a separate rim member with a rubber-like insert or ring located between the outer radial edge of the web and the inner radial edge of the rim. An example of this configuration is disclosed in U.S. Pat. No. 2,307,129 entitled "Shock Proof Gear", issued to Hines et al. on Jan. 5, 1943, which is incorporated by reference herewithin. Although the rubber-like insert of Hines is supposed to dampen audible vibrations and somewhat reduce resultant stresses within the gear, under load the rim is capable of compressing one side of the rubber-like insert such that the rotational axis of the rim could become axially offset from the rotational axis of the hub. This misalignment can cause partial or complete disengagement of the gear teeth of the compliant gear from those of its mating gear. In addition, gears having this type of rubber-like insert strictly between the web and the rim are subject to the rim torquing away from the hub in a transverse direction normal to the direction of rotation. Under load this transverse movement may also cause misalignment of the mating gear teeth which will localize stresses upon distinct portions of each tooth. Moreover, the hub and rim may not provide an adequate attachment, and thus force transfer, surface for the rubber-like insert in extreme torque situations. A similar design using elastomeric laminates with a shim therebetween is disclosed in U.S. Pat. No. 4,674,351 entitled "Compliant Gear", issued to Byrd on Jun. 23, 1987.

Another compliant rotating member configuration is disclosed in Figure 8 of U.S. Pat. No. 3,216,267 entitled "Rotary Motion Transmitting Mechanism For Internal Combustion Engines And The Like", issued to Dolza on Nov. 9, 1965. The Dolza sprocket/gear design contains a stamped cup-shaped hub which has an outward radially extending flange and a cushioning member fully attached to the side thereof. The rim of the sprocket/gear has a generally L-shaped cross section with the radial inward leg being fully attached to the opposite side of the cushioning member. In that design there are gaps between the outer circumference of the cushioning member and the inside radial surface of the rim and also a gap between the radially inward surface of the cushioning member and the radially outward horizontal edge of the cup-shaped hub section. While the sprocket/gear is designed to maintain angular torsional rigidity while having radial flexibility, under load the rim of the sprocket/gear may become elliptical and thus encroach upon the gaps created above and below the cushioning member. Moreover, the rotational axis of the rim may also become offset from the rotational axis of the hub under working conditions.

It is also known to provide a sunroof motor with a conventional gear having a unitary polymeric rim, offset web and hub. This gear further has a receptacle and an inner set of rim channels for receiving a metallic cup in an interlocking fashion. A Belleville washer frictionally rides against an outer surface of the metal cup and is interlocked to a pinion shaft. The gear is also journalled freely about the shaft. The amount of frictional force exerted by the Belleville washer against the cup is controlled by the amount of torque supplied to a pinion shaft engaging nut; thus, the Belleville washer acts as a clutch mechanism. However, this traditional sunroof motor is not provided with a rotational stress dissipating structure beyond the coaxial Belleville washer. This sunroof motor and gear system also suffers from being large in transverse size and heavy in weight.

Furthermore, many conventional clutches employ rotation dampening devices and spring biasing devices. For instance, reference should be made to the following U.S. Pat. No. 5,333,713 entitled "Friction Clutch" which issued to Hagnere et al. on Aug. 2, 1994; U.S. Pat. No. 5,322,141 entitled "Damped Driven Disk Assembly" which issued to Szadkowski on Jun. 21, 1994; U.S. Pat. No. 5,310,025 entitled "Aircraft Brake Vibration Damper" which issued to Anderson on May 10, 1994; U.S. Pat. No. 5,308,282 entitled "Pressure Plate for a Vibration Damper Assembly having Built-In Lash" which issued to Hansen et al. on May 3, 1994; U.S. Pat. No. 5,273,145 entitled "Hydraulic Clutch Control Means, In Particular For A Motor Vehicle" which issued to Corral et al. on Dec. 28, 1993; U.S. Pat. No. 5,186,077 entitled "Torque Variation Absorbing Device" which issued to Nakane on Feb. 16, 1993; U.S. Pat. No.

5,161,660 entitled "Clutch Plate with Plural Dampers" which issued to Huber on Nov. 10, 1992; U.S. Pat. No. RE 34,105 entitled "Internal Assisted Clutch" which issued to Flotow et al. on Oct. 20, 1992; and U.S. Pat. No. 4,996,892 entitled "Flywheel Assembly" which issued to Yamamoto on Mar. 5, 1991; all of which are incorporated by reference herewithin. While many of these clutch constructions recognize an unsatisfied need for rotational stress reduction devices therein, and propose various supposed improvements therein, further improvement in performance, cost and assembly would be desirable. For example, the rotationally oriented compression springs utilized in some of these constructions can be easily overcompressed beyond their elasticity limit, thus, leading to poor subsequent performance. By themselves, these compression springs are not well suited for repeated, high load, full compression.

SUMMARY OF THE INVENTION

In accordance with the present invention, a preferred embodiment of a rotatable apparatus includes a pair of rotatable members joined by a stress dissipating structure. The stress dissipating structure can be employed in a gear, sprocket, clutch or the like. In one aspect of the present invention, the stress dissipating structure includes an elastomeric material and a web which radially extend outward from the hub. In another aspect of the present invention, the stress dissipating structure includes a plurality of rotationally flexible spoke-like structures radially extending between the rim and the hub. In a further aspect of the present invention, corrugated spokes are used. An additional aspect of the present invention provides a stress dissipating structure employing various anti-buckling plate configurations. In still another preferred aspect of the present invention, the stress dissipating structure includes a plurality of rotatably deformable formations. Furthermore, the present invention provides a compressible washer stress reduction structure. In yet another aspect of the present invention, an external clutch mechanism and internal stress reduction system are employed.

The configuration of the apparatus of the present invention is advantageous over conventional gears in that the present invention allows the stress dissipating structure to absorb structural stresses created between the hub and the rim due to instantaneous shocks created by apparatus rotational start-up or shut-down, cyclical fatigue, and/or overload. Furthermore, the stress dissipating resilient structure, especially with anti-buckling plates, supplies significant lateral planar rigidity thereby resisting angular torsional deformation in a direction normal to the rotational axis between the rim and the hub while also discouraging rotational axis misalignment between the rim and the hub. The compressible washer and compressing block construction, and spoke, groove and spring combination provide high load rotational stress dissipate for high temperature environments. By matching the bulk torsional rigidity and allowed torsional deformations of the stress dissipating structure, which can be a function of its modules of elasticity, its dimensional thickness or the specific formations chosen, to that of the output coupling performance proportions, the beneficial characteristics of a conventional single piece homogenous gear sprocket are maintained while the resilient structure acts to synergistically dissipate stresses between the toothed rim and the hub. Additional objects, advantages, and features of the present invention will become apparent from the following description and appended claims, taken in conjunction with the accompanying drawings.

In accordance with the present invention, another preferred embodiment of a rotatable apparatus includes a pair of rotatable members joined by a stress dissipating structure. The stress dissipating structure can be employed in a gear, sprocket, clutch or the like. In one embodiment of the present invention, anti-buckling plates generally spanning between a hub and rim define a hollow cavity. In another embodiment of the present invention, the stress dissipating structure includes specifically configured sets of nodules moving with the hub and rim. An additional aspect of the present invention provides a stress dissipating structure employing various anti-buckling plate attachment constructions. In still another embodiment of the present invention, a uniquely sized and packaged gear, gear housing and/or motor are employed in order to maximize output force per pound of material efficiencies. An additional advantage of the present invention over conventional systems is that the present invention allows for a worm drive system coupled to a pinion gear to be vastly improved regarding weight and size and, hence, power density (i.e., pounds torque achieved per pound of material utilized). This is realized by recognizing that torque is directly proportional to force times distance and to horsepower divided by speed. Thus, by using a reduced size motor with worm gear attached to power a ring or driven gear with an integrally attached pinion, power density efficiencies greater than 50% over conventional systems are achievable.

The configurations of the apparatus of the present invention are advantageous over conventional systems in that the present invention allows the stress dissipating structure to absorb structural stresses between the hub and the rim due to instantaneous shocks created by apparatus rotational start-up or shut-down, cyclical fatigue, and/or overload. Furthermore, the stress dissipating resilient structure, especially when coupled with anti-buckling plates, provides significant lateral planar rigidity thereby resisting angular torsional deformation in a direction normal to the rotational axis between the rim and the hub while also discouraging rotational axis misalignment between the rim and the hub (i.e., the center to center distances between driven and drive gears are always maintained). By matching the bulk torsional rigidity and allowed torsional deformations of the stress dissipating structure, which can be a function of its modules of elasticity, its dimensional thickness, or the specific formations chosen, to that of the output coupling performance proportions, the beneficial characteristics of a conventional single piece homogenous gear, sprocket and clutch are maintained while the resilient structure acts to synergistically dissipate stresses between the rim and the hub.

The apparatus of the present invention is also much thinner in a transverse (or crossbar) direction than conventional apparatuses thereby providing packaging benefits. Furthermore, the present invention is significantly lighter in weight than conventional systems while still increasing the output force per pound of material efficiencies.

In accordance with the present invention, yet another preferred embodiment of the present invention provides a stress dissipation rotatable member disposed within an automotive vehicle door lock mechanism. Yet another aspect of the present invention, the stress rotatable member operably reduces sudden movement stresses within a drive transmission during a movement of a latch. In a further aspect of the present invention, another stress dissipation rotatable member includes a boss protruding from an outer face of a circular plate upon which is mounted a separate pinion gear. A stress dissipation structure couples the plate to a rim while also allowing some different rotational movement there between during start up and stopping situations. Additional objects, advantages, and features of the present invention will become apparent from the following description and appended claims, taken in conjunction with the accompanying drawings.

BRIEF DESCRIPTION OF THE DRAWINGS

FIG. 1 is a perspective view showing a first preferred embodiment of a rotatable apparatus of the present invention;

FIG. 1A is an enlarged and fragmentary cross-sectional view, taken along line 1A—1A of FIG. 1, showing the first preferred embodiment rotatable apparatus of the present invention;

FIG. 2 is an exploded perspective view showing the first preferred embodiment rotatable apparatus of the present invention;

FIG. 5 is a perspective view showing a second preferred embodiment of a rotatable apparatus of the present invention;

FIG. 6 is an exploded perspective view showing the second preferred embodiment rotatable apparatus of the present invention;

FIG. 13 is an exploded perspective view showing a fourth preferred embodiment of a rotatable apparatus of the present invention;

FIG. 14 is a side elevational view showing the fourth preferred embodiment rotatable apparatus of the present invention;

FIG. 15 is a cross-sectional view, taken along line 15—15 of FIG. 14, showing the fourth preferred embodiment rotatable apparatus of the present invention;

FIG. 16 is a diagrammatic side elevational view showing a fifth preferred embodiment of a rotatable apparatus of the present invention;

FIG. 25 is a diagrammatic side elevational view showing a tenth preferred embodiment of a rotatable apparatus of the present invention in a stress dissipating position;

FIG. 26 is a diagrammatic side elevational view showing an eleventh preferred embodiment of a rotatable apparatus of the present invention in a nominal position;

FIG. 27 is a diagrammatic side elevational view showing the eleventh preferred embodiment rotatable apparatus of the present invention in a stress dissipating position;

FIG. 36 is a diagrammatic side elevational view showing an eighth alternate embodiment of a rotatable apparatus of the present invention;

FIG. 37 is a diagrammatic side elevational view showing a ninth alternate embodiment of a rotatable apparatus of the present invention and FIG. 38 is a cross-sectional view, taken along line 38—38 of FIG. 37, showing the ninth alternate embodiment rotatable apparatus of the present invention.

DETAILED DESCRIPTION OF THE PREFERRED EMBODIMENT

Figure 3:
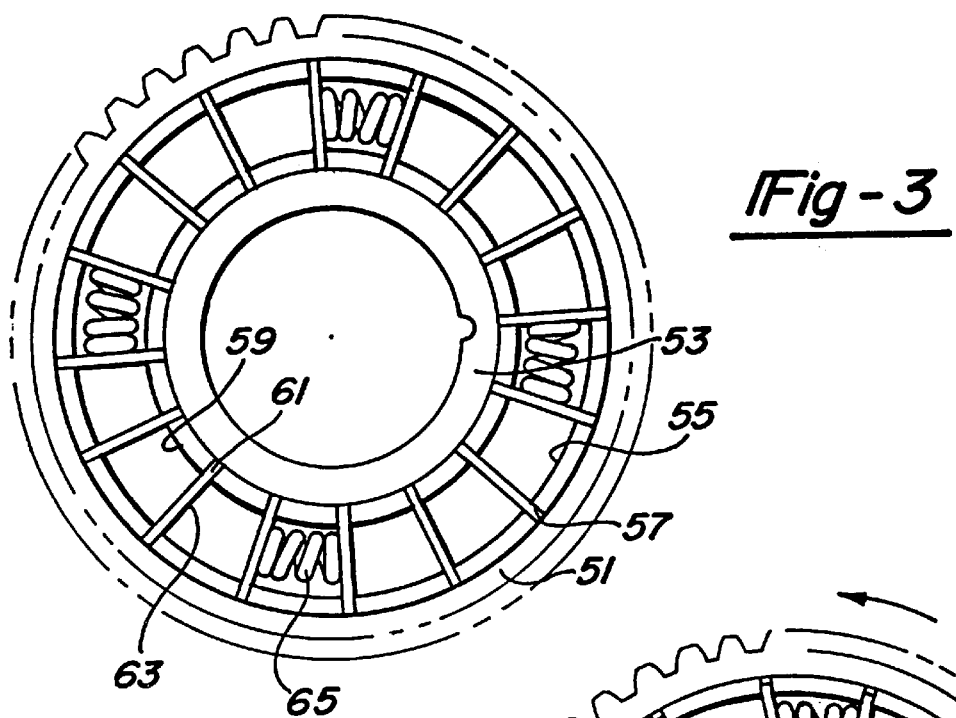
FIG. 3 is a diagrammatic side elevational view showing the first preferred embodiment rotatable apparatus of the present invention in a nominal position.

Referring to FIGS. 1 through 4, a first preferred embodiment of a rotatable apparatus of the present invention includes a rim 51 and concentric hub 53, both of which have external surfaces with gear teeth 54 outwardly extending therefrom. An annularly stepped ring 54a is integrally disposed between gear teeth 54b and the grooved portion of hub 53. An inner surface 55 of rim 51 is provided with a set of transversely extending grooves 57. In registry therewith, an external surface 59 of hub 53 also has a set of transversely extending grooves 61. A plurality of somewhat hourglass shaped spokes 63 span between rim 51 and hub 53 by having ends thereof movably engagable within registering grooves 57 and 61. Four compression springs 65 are each disposed between adjacent spokes 63. It should be appreciated that more or less springs and spokes, as well as spokes with differing shapes, may be alternately employed.

Figure 4:
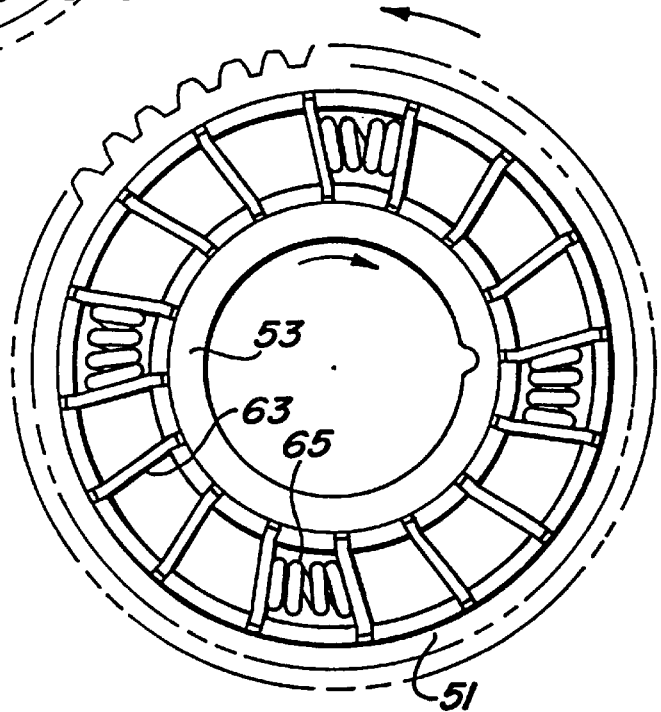
FIG. 4 is diagrammatic side elevational view showing the first preferred embodiment rotatable apparatus of the present invention in a stress dissipating position.

The stress dissipating nature of this device can be observed by comparing the concurrent nominal rotation of rim 51 and hub 53 of FIG. 3 to a typical torque intensive starting up, changing of direction, or slowing down rotational mode of FIG. 4 wherein rim 51 and hub 53 rotate a differing amount or at a different speed. Spokes 63 are flexible in a direction of rotation and can be radially moved within the grooves 57 and 61 when rim 51 rotates a differing amount or at a different speed than hub 53. Thus, the stress dissipation structure, consisting of spokes 63 and springs 65, act to dissipate these rotational stresses. Additionally, a pair of annular anti-buckling plates 65a are preferably fastened to hub 53 for rotational movement therewith. A retainer ring 67 is fastened to rim 51 and serves to slidable trap the adjacent anti-buckling plate 65a between itself and the adjacent portion of rim 51. These anti-buckling plates 65a maintain the coaxial alignment of rim 51 and hub 53 while also preventing lateral twisting differential between rim 51 and hub 53. Of course, the anti-buckling plates 65a can be alternately rotationally secured to rim 51 for slidable movement against hub 53 for this and the other embodiments discussed hereinafter. The rim, hub and anti-buckling plates 65a are preferably made from a high strength steel material while the spokes and compression springs 65 are made from a high strength spring steel. This embodiment is ideally suited for use in repetitive, high temperature and load intensive applications such as for automotive vehicle transmission gears or the like. It should further be appreciated, however, that this and all of the other stress dissipation structure embodiments can be used for other rotatable members such as sprockets, clutches, driveshafts and the like.

A second preferred embodiment of a rotatable apparatus of the present invention is disclosed in FIGS. 5 through 8. In this embodiment, a high strength steel gear includes a rim 71, web 73, and hub 75. A stress dissipation structure includes a pair of oppositely disposed sets of frustoconical or belleville washers 77, each having an aperture and a compressible axis 79. The stress dissipation structure further includes a rigid pair of depressing blocks 81, four compression springs 83 and a pair of annular anti-buckling plates 85. Each set of belleville washers 77 has the washers stacked on top of each other along the compressible axis and are juxtapositioned within a radial cavity 87 of web 73. Each compressing block 81 is disposed against an end of one of the belleville washers 77 for selective rotatable engagement by an outer surface discontinuity 89, such as a shape intersection, bump, or other projection of hub 75.

Hub 75 further has elliptical outer surface sections 91 bordered by flats 93. Discontinuity 89 is created at each intersection of flat 93 and elliptical section 91. Furthermore, a pair of arms 95 radially project outward from hub 75. Each arm has an enlarged distal end for engagement with ends of adjacent compression springs 83. The opposite ends of compression springs 83 are received within receptacles of web 73. Thus, as can be observed by comparing FIGS. 7 and 8, when rim 71 and hub 75 rotate differing amounts, the rotational stresses caused therebetween are initially absorbed by compression of arms 95 against compression springs 83 and then subsequently reduced by surface discontinuities 89 forcing compressing blocks 81 to axially compress belleville washers 77. This construction is extremely advantageous since the belleville washers can be fully compressed and subsequently returned to their nominal frustoconical configurations in a repetitious, high temperature and high load environment. Compression springs 83 further serve to return and center the hub in relation to the rim during non-rotational stress conditions. Alternately, web 73 may be attached to the hub while one or more surface discontinuities and arms extend inwardly from the rim 71.

FIGS. 9 through 12 illustrate a third preferred embodiment of a rotatable apparatus of the present invention. This apparatus has a rim 101 with an integrally, injection molded anti-buckling plate 103 and an integrally molded and transversely extending hub inner collar 105. Furthermore, three spokes or nodules 107 extend radially inward from an inside surface of rim 101, spaced at 60 degrees from each other, and transversely extend from anti-buckling plate 103. A second anti-buckling plate 113 has a hub outer collar 115 of a cylindrical configuration with three spokes or nodules 117 outwardly extending therefrom in a radial manner and extending in a transverse manner from anti-buckling plate 113. A natural rubber or synthetic elastomeric material 119 is insert molded or otherwise assembled between the anti-buckling plates and nodules. Synthetic elastomers selected may be of the thermoplastic or thermoset type; actual optimal selection depends upon the functional use requirements of the gear under study. By way of example, Santoprene 55, a thermoplastic elastomeric, has been ostensibly used in the embodiments disclosed herein. When assembled, the nodules are equally offset from each other with the elastomeric material therebetween. In this embodiment, the radial length of the nodules overlap each other. Furthermore, outer collar 115 concentrically fits about inner collar 105 but these collars are rotatably independent from each other except for the stress dissipating characteristics and coupling effects caused by the elastomeric material therebetween.

Additionally, when assembled, a circumferential edge 121 of anti-buckling plate 113 snap fits into a circular groove 123 disposed within an inside surface of rim 101. Groove 123 serves to transversely maintain anti-buckling plate 113 while still allowing it to rotate and slide freely in relation to rim 101. A pair of oppositely oriented D-shaped formations 125 are also disposed along an outer surface of anti-buckling plate 113 for engagement by a driveshaft or the like. It has been found that a stress dissipation gear of this embodiment has successfully surpassed 3600 operational cycles in an accelerated, loaded windowlift motor test operating at 175° F. without failure. It should also be appreciated, that the inner collar 105 could be deleted with anti-buckling plate 103 snap fitting within a groove circumferentially surrounding outer hub collar 115. The rim, hub and anti-buckling plates are all preferably injection molded from an engineering material such as polyacetyl or from a modified PBT.

Figure 9:
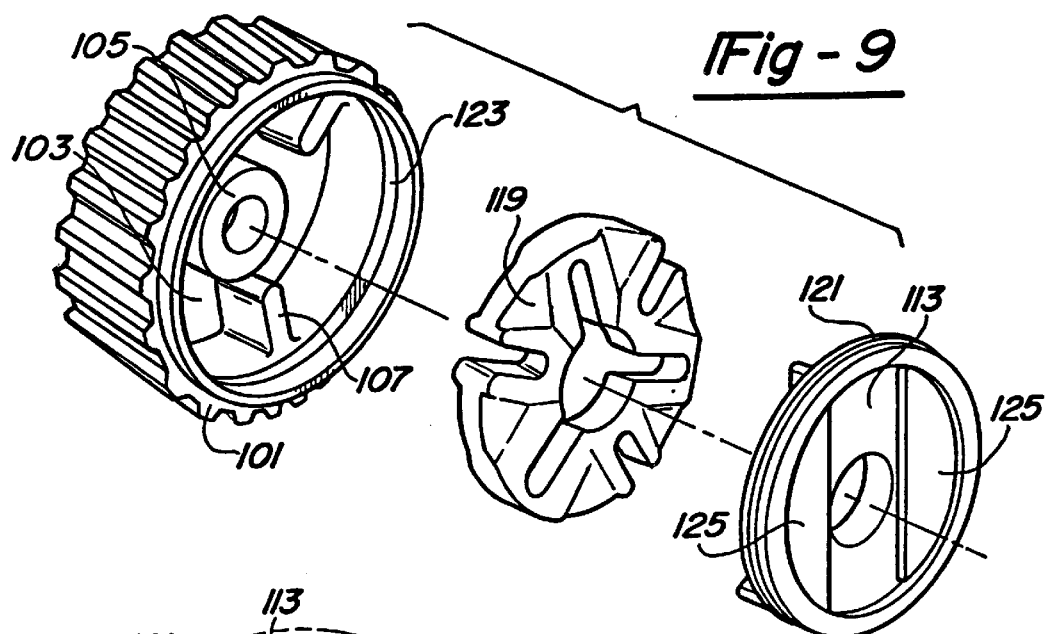
FIG. 9 is an exploded perspective view showing a third preferred embodiment of a rotatable apparatus of the present invention.
Figure 10:
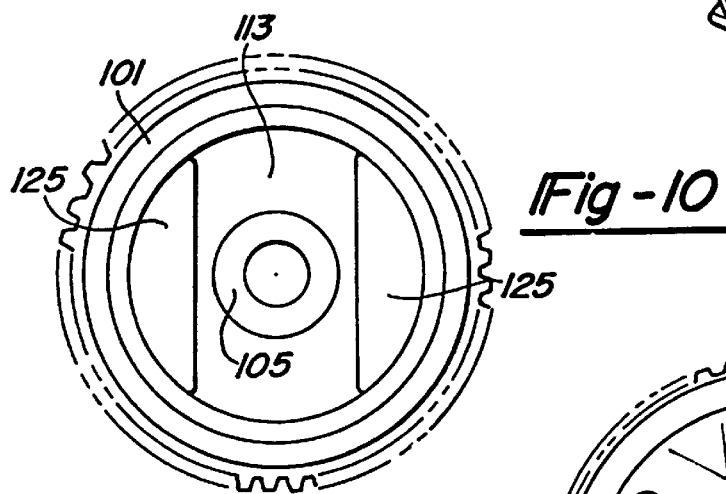
FIG. 10 is a side elevational view showing the third preferred embodiment rotatable apparatus of the present invention.
Figure 11:
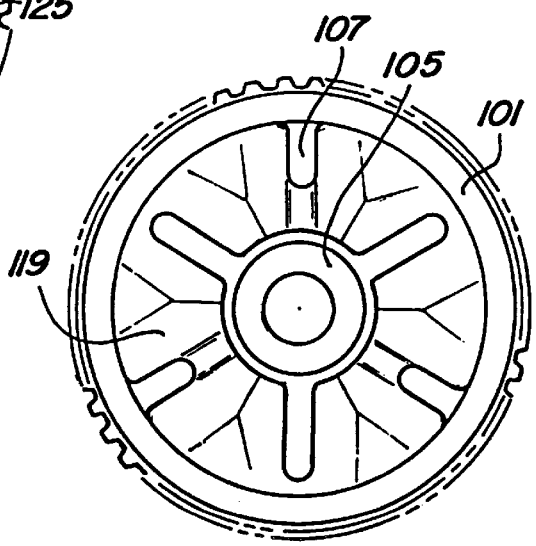
FIG. 11 is a side elevational view, with an anti-buckling plate broken away therefrom, showing the third preferred embodiment rotatable apparatus of the present invention.
Figure 12:
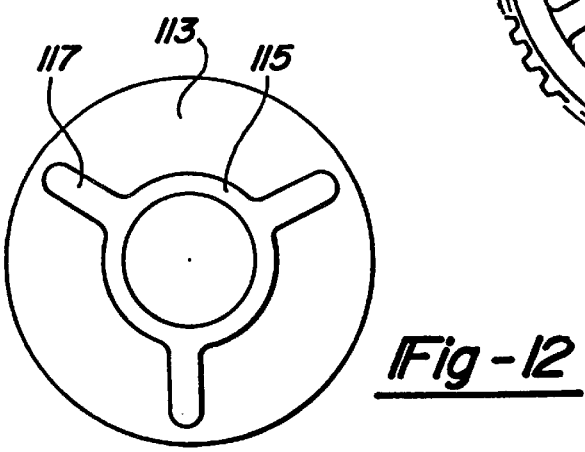
FIG. 12 is a side elevation view showing the anti-buckling plate employed in the third preferred embodiment rotatable apparatus of the present invention.

Referring to FIGS. 13 through 15, a fourth preferred embodiment of a rotatable apparatus of the present invention is disclosed which is substantially the same as the third embodiment except this fourth embodiment uses an annular retainer ring 131 which is sonic welded to a rim 133 for slidably trapping anti-buckling plate 135 thereagainst. This is used instead of the previously described groove. Furthermore, the double-D-shaped drive formations 137 are elevated beyond anti-buckling plate 135 in this embodiment rather than being partially depressed below a raised peripheral surface as shown in FIGS. 9 and 10. A stress dissipation structure includes nodules 139, nodules 141 and elastomeric material 143 therebetween.

FIG. 16 shows a fifth preferred embodiment of a rotatable apparatus of the present invention wherein a highly radiused set of nodules 151 that extend outwardly in a radial manner from a rim 153. Offset therefrom, is a set of nodules 155 that extend outwardly in a radial manner from a hub 157. Hub 157 can rotate independently from rim 153 with the exception of the interactions of an elastomeric material 159 disposed therebetween. As contrasted to the prior embodiments, this fifth preferred embodiment employs a non-overlapping nodule configuration wherein the radial amount of elastomeric material R between rotational paths of nodules 151 and 155 can be incrementally compressed and allowed to absorb the rotational differential stresses between rim 153 and hub 157. Thus, the theoretical area 161 represents a median stress plane wherein the greatest amount of torsional elastomeric material deformation occurs. Depending upon the specific loading and rotational member structural configurations employed, as well as the elastomeric type used, the radial length, flexibility and shape of the nodules can be varied as shown throughout the various embodiments illustrated herewith.

Figure 17:
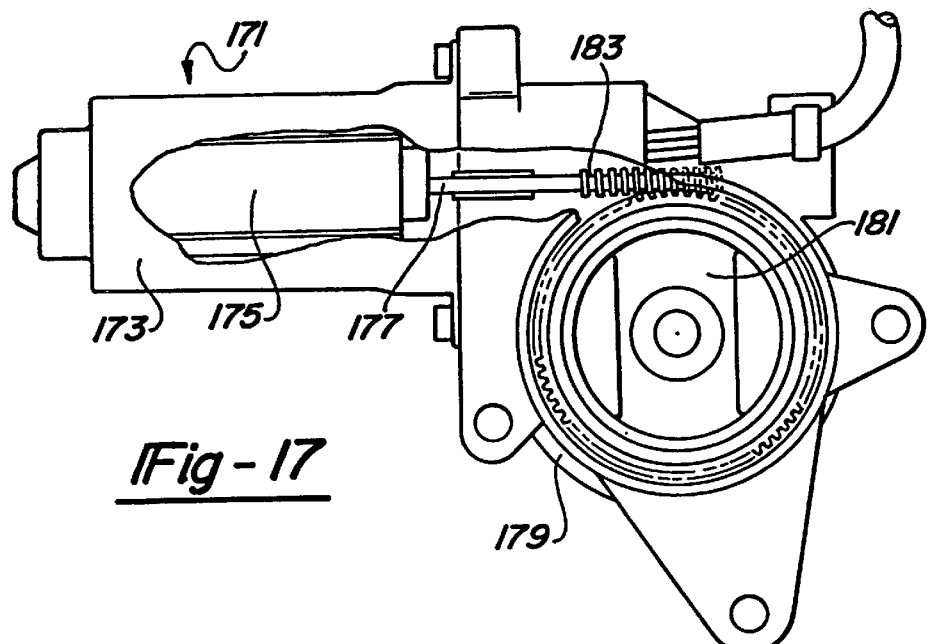
FIG. 17 is a side elevation view, with portions broken away therefrom, showing a motor assembly and a rotatable apparatus of a sixth preferred embodiment of the present invention.

A sixth preferred embodiment, shown in FIG. 17, illustrates a motor assembly employing a rotatable apparatus of FIG. 9 of the present invention. This motor assembly 171 includes a motor housing 173, an armature 175, an armature shaft 177, a gear housing 179 and a gear 181 having a rotational stress dissipation structure therein. Furthermore, armature 175 is rotationally mounted upon armature shaft 177 which has a worm gear segment 183. Worm gear segment 183 extends within a bore of gear housing 179 for enmeshed engagement with external teeth of gear 181. Motor housing 173 and gear housing 179 are secured together. Motor assembly 171 is of a fractional horsepower dc variety having a fixed stator, brush cards and the like. It is envisioned that this motor can be used for driving automotive window lift mechanisms, sun roofs, and the like.

Gear 181 can be significantly reduced in diametrical size due to the unified and integrated stress dissipation structure employed, such as those of the previous and following embodiments. These novel gears allow for an approximately fifty percent or more reduction in diametrical size (compared to traditional multi-piece gears for the same application measuring approximately 2.15 inches). Notwithstanding, the width of the gear may need to be increased up to 100 percent, to about one lateral inch in order to maximize elastomeric cross sectional area, as compared to conventional multi-piece gears. However, such a width increase is not always necessary if different flexibility of the disclosed stress reduction structures are used. This reduction in gear diameter further allows for a proportional decrease in gear housing size due to overall compactness and use of a single assembled piece gear construction. Thus, improved motor assembly packaging for a door or sunroof assembly. Any increase in gear width and gear housing width is still no larger than the conventional thickness of the motor housing. Furthermore, the reduction in gear diameter size allows the armature shaft and armature to rotate at proportionally lower revolutions per minute (rpm). This reduced rpm has further advantageous side effects such as reducing the deceleration shock on the gear teeth during stoppage and allowing for a higher torque to be created in a direct current motor (depending on the applied load). Given a constant load, the speed/torque curves of a dc motor can be taken advantage of with the use of a lower rpm armature shaft and armature, which in turn would provide for the reduction in armature current, which would promote motor life and reduce heat generation by about 10° F. Additional reduced heat generation is achieved as a result of reduced worm rpm. Thus, the present invention gears achieve material cost savings, increased motor performance, higher use temperatures, smaller packaging sizes, system and component cost reductions, and material savings while achieving increased or at least equivalent rotational stress dissipation performance.

Figure 19:
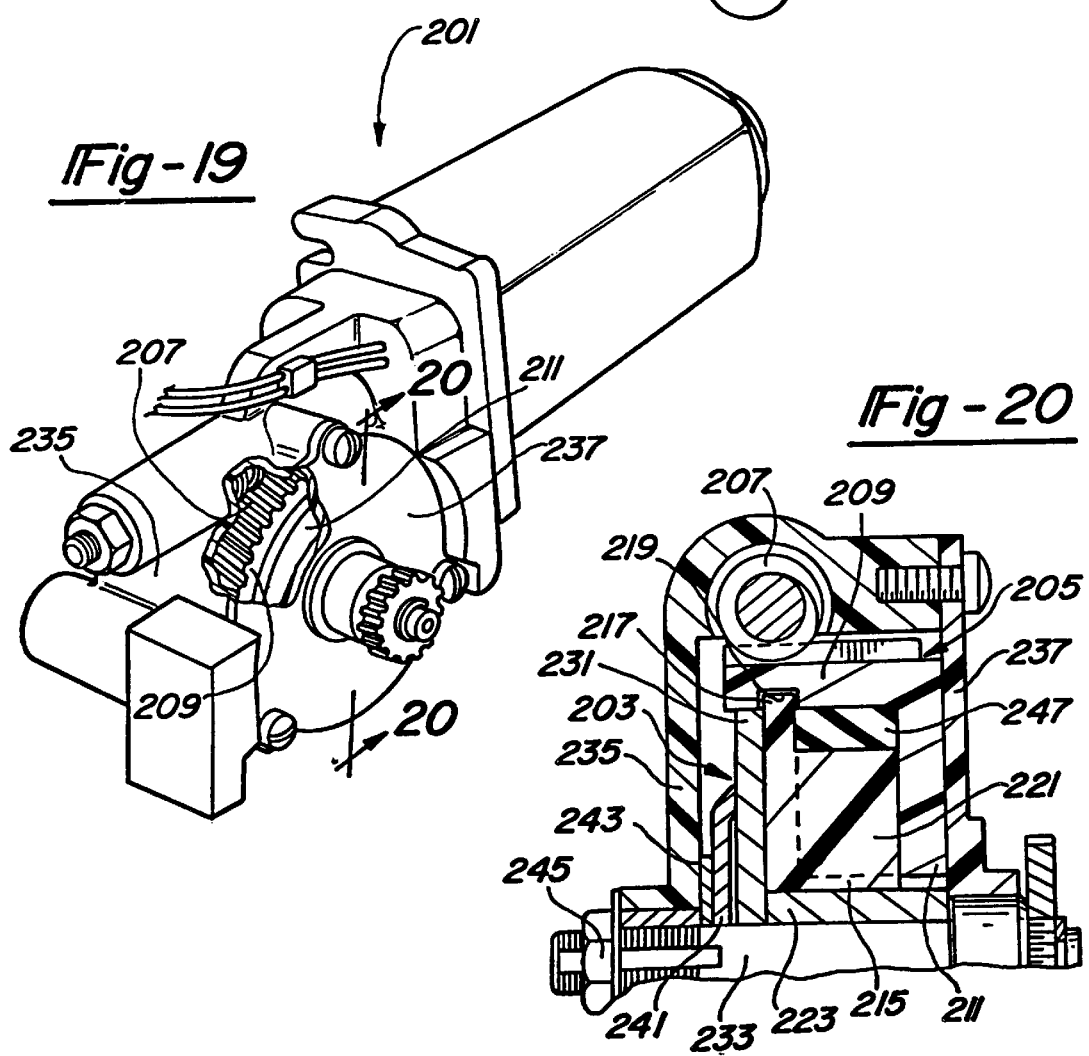
FIG. 19 is a perspective view, with portion broken away therefrom, showing the seventh preferred embodiment of the motor assembly and rotatable apparatus of the present invention.
Figure 20:
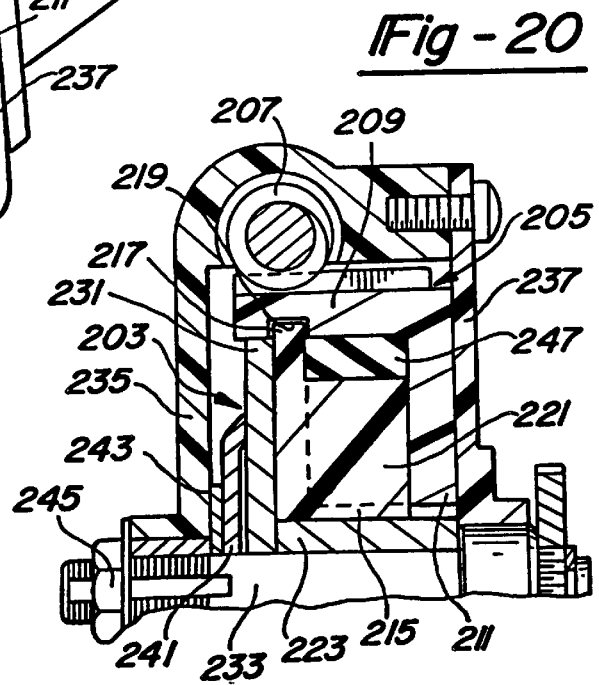
FIG. 20 is a cross-sectional view, taken along line 20—20 of FIG. 19, showing the seventh preferred embodiment of the motor assembly and rotatable apparatus of the present invention.
Figure 18:
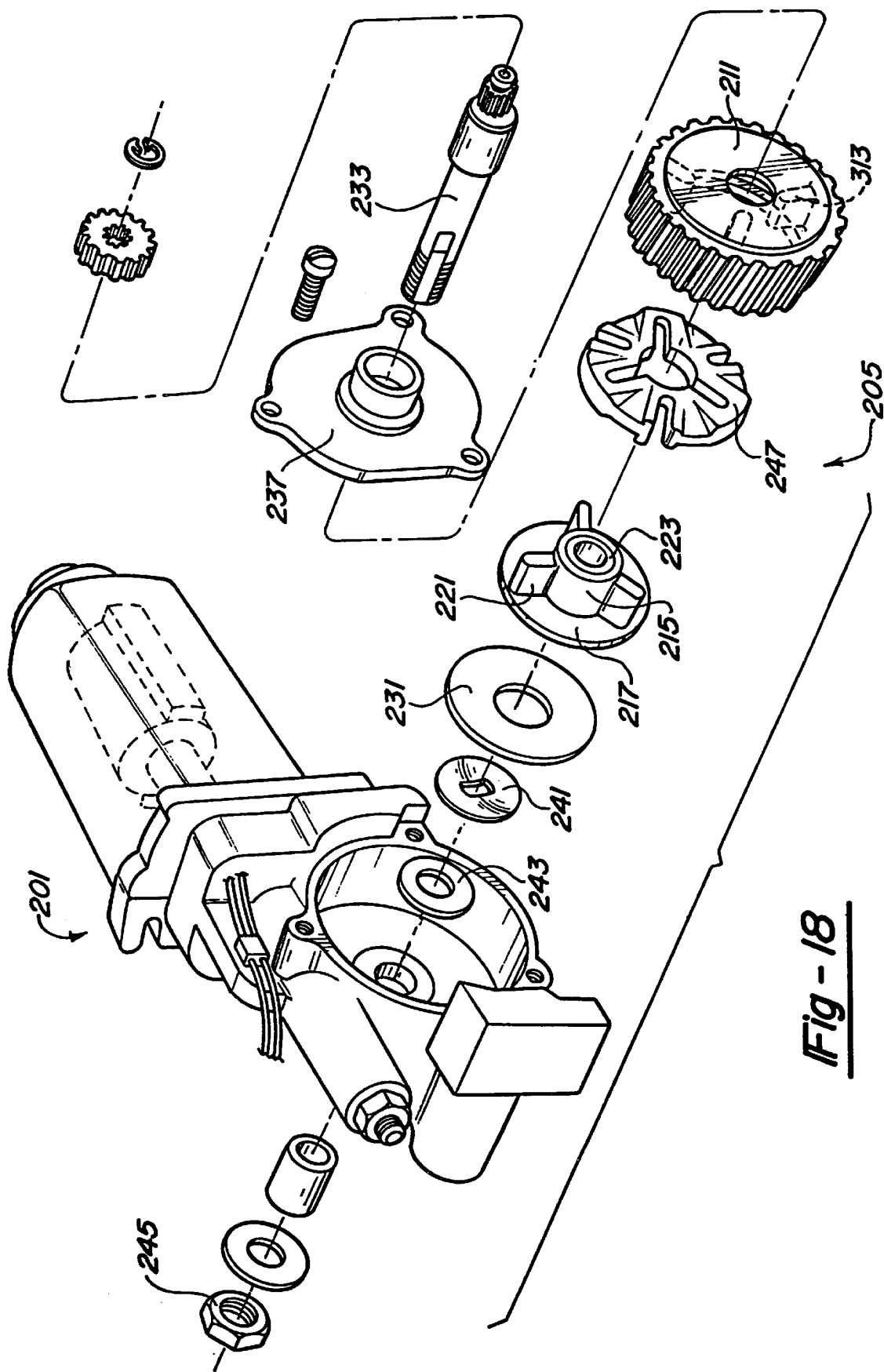
FIG. 18 is an exploded perspective view showing a seventh preferred embodiment of a motor assembly and a rotatable apparatus of the present invention.

FIGS. 18 through 20 illustrate a seventh preferred embodiment of the present invention which provides a motor assembly 201 employing a clutch mechanism 203 and a gear 205 with a stress dissipating structure. A worm gear segment 207 of armature shaft is enmeshed with external gear teeth extending from a rim 209. Rim 209 further has an anti-buckling plate 211 integrally molded therewith and three nodules 313 extending inwardly therefrom. Gear 205 further has a hub 215 with an integrally formed anti-buckling plate 217 radially extending outward therefrom. A circumferential edge of plate 217 engages within an inner rim groove 219. Three nodules 221 outwardly project from hub 215 and transversely project from anti-buckling plate 217. An inner metal collar 223 is concentrically juxtapositioned in engaging fashion with a hub 215 for providing journalling and laterally compressive bearing surfaces. Anti-buckling plate 217 is laterally depressed below an outer lateral surface of rim 209 for receiving a metal friction plate washer 231 thereagainst. Gear 205 and friction plate washer 231 can freely spin about a cylindrical portion of a pinion shaft 23 generally mounted between a gear housing 235 and a cover plate 237. A belleville washer 241 is keyholed onto shaft 233 for movement therewith. A metal washer 243 is disposed between belleville washer 241 and gear housing 235. A threaded nut 245 is threadably engaged upon a threaded end of shaft 233 and is tightened with a predetermined amount of torque to frictionally engage belleville washer 241 against friction plate washer 231. Thus, nut 245, belleville washer 241 and flat friction plate washer 231 provide a clutch function between gear 205 and pinion shaft 233. This allows for gear 205 to rotatably drive shaft 233 and a device coupled thereto unless a load induced torque is exceeded; at this point, gear will be allowed to spin without causing coincidental rotation of belleville washer 241 and pinion shaft 233. Thus, clutch mechanism 203 provides a first gear overload reduction and stress dissipation feature. A second overload reduction and stress dissipation feature is achieved through use of elastomeric material 247 disposed between nodules 221 and 107 within gear 205. The washers 231, 241 and 243 are preferably of a self-lubricous type made from a phosphor bronze or the like steel material. The gear housing is preferably injection molded from an engineering grade of polymeric material or die castable metal.

Figure 21:
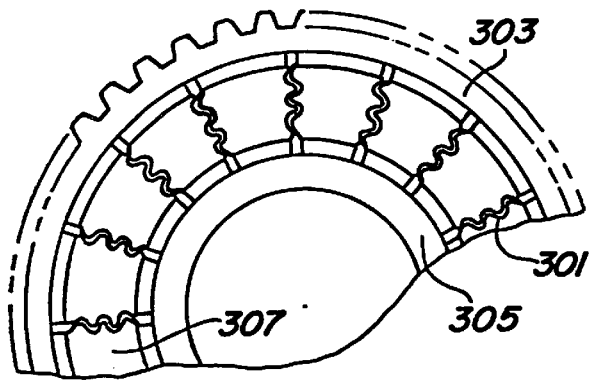
FIG. 21 is a diagrammatic side elevational view showing an eighth preferred embodiment of a rotatable apparatus of the present invention.

FIG. 21 shows an eighth preferred embodiment of a rotatable apparatus of the present invention. In this embodiment, a plurality of corrugated spring steel spokes 301 span between a gear rim 303 and a hub 305. Ends of the spokes 301 are disposed in hub and rim grooves similar to those disclosed in FIG. 3. Alternately, the ends of spokes 301 can be permanently affixed to either or both the hub and rim. The corrugations within each spoke 301 provide further flexibility for spokes 301. One or more anti-buckling plates 307 are also provided and an elastomeric material can further be inserted therebetween if needed.

Figure 22:
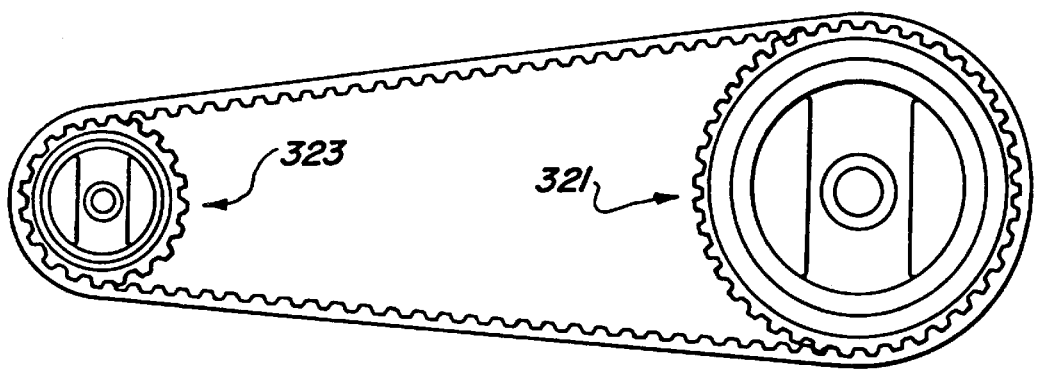
FIG. 22 is a side elevational view showing a ninth preferred embodiment of a rotatable apparatus of the present invention.
Figure 23:
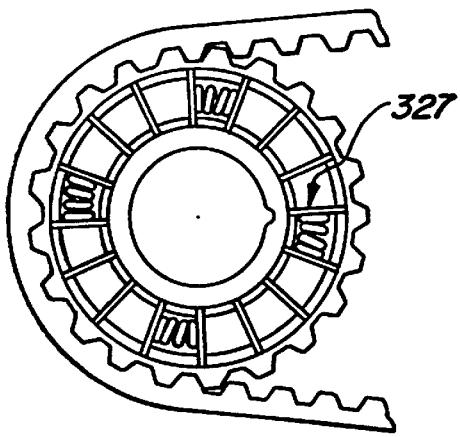
FIG. 23 is a diagrammatic side elevational view of a portion of the ninth preferred embodiment rotatable apparatus of the present invention.

A ninth preferred embodiment of a rotatable apparatus of the present invention is disclosed in FIGS. 22 and 23. This embodiment shows a driving sprocket 321 coupled to a driven sprocket 323 by a flexible belt 325 with internal steps therein. Alternately, a chain or perforated belt can be employed. A stress dissipation structure 327 is employed within each sprocket 321 and 323. However, any of the other prior or hereafter described stress dissipation structure embodiments can also be used for such a sprocket construction.

Figure 24:
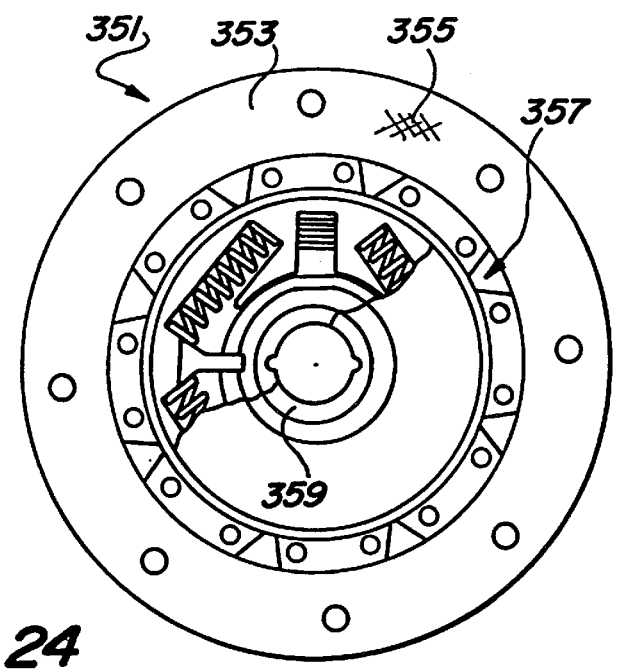
FIG. 24 is a diagrammatic side elevational view showing a tenth preferred embodiment of a rotatable apparatus of the present invention in a nominal position.

FIGS. 24 and 25 show a tenth preferred embodiment of a rotatable apparatus of the present invention. Specifically, the rotatable apparatus is a clutch plate 351 having a rim 353 with a friction material 355 disposed along a lateral surface or circumferential surface thereof depending on the specific clutch construction. Clutch plate 351 further has an internal stress dissipation structure 357 to account for rotational differences between rim 353 and a hub 359. FIG. 24 shows the stress dissipation structure of FIG. 7 disposed in a nominal and unstressed manner while FIG. 25 shows the same clutch plate and stress dissipation structure disposed in a differential rotation mode.

An eleventh preferred embodiment of a rotatable apparatus of the present invention can be observed in FIGS. 26 and 27, respectively showing nominal and rotational differential orientations of a clutch plate 371 having an internal stress dissipation structure 373 like that of FIG. 3.

Figure 28:
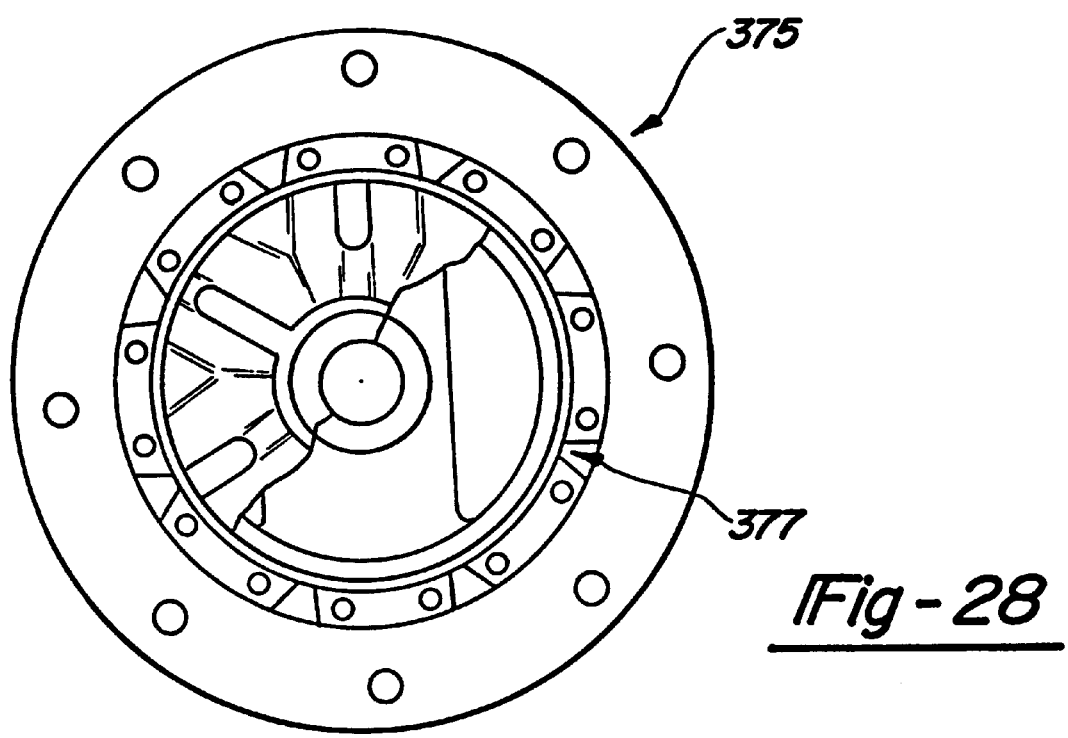
FIG. 28 is a diagrammatic side elevational view showing a twelfth preferred embodiment of a rotatable apparatus of the present invention.

A twelfth and final preferred embodiment of a rotatable apparatus of the present invention is shown in FIG. 28. In this twelfth embodiment, a clutch plate 375 has an internal stress dissipation structure 377 like that of FIG. 9. This embodiment is ideally designed for employment in a lower temperature, non-engine compartment/vehicle transmission application. It should also be appreciated that the use of the term "clutch plate" equally applies to clutch fly wheels and the like.

Figure 29:
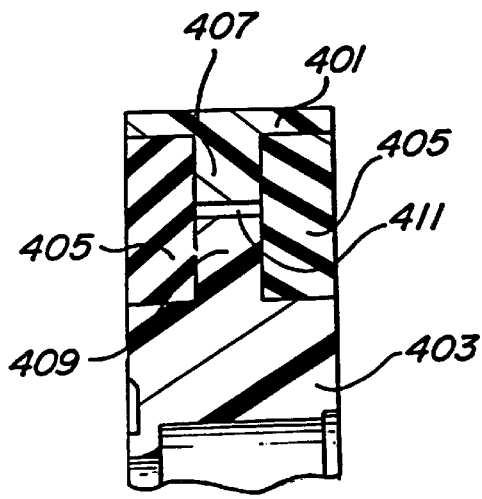
FIG. 29 is a diagrammatic cross-sectional view showing a first alternate embodiment of a rotatable apparatus of the present invention.

Various alternate embodiment constructions of generic rotatable apparatuses are disclosed in FIGS. 29 through 35. All of these embodiments have independent rims 401 and hubs 403 coupled together by a stress dissipation structure. For example, FIG. 29 shows a pair of disc-like elastomeric members 405 bordering an annular rib 407 and an annular web 409 with a gap 411 disposed therebetween.

Figure 30:
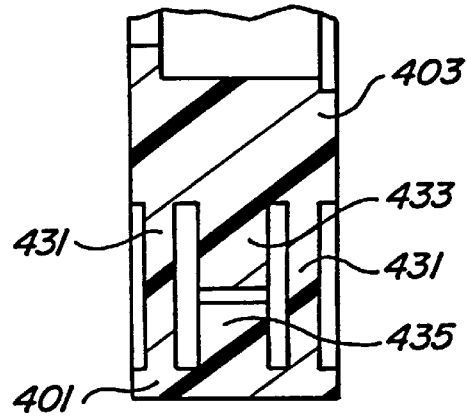
FIG. 30 is a diagrammatic cross-sectional view showing a second alternate embodiment of a rotatable apparatus of the present invention.
Figure 31:
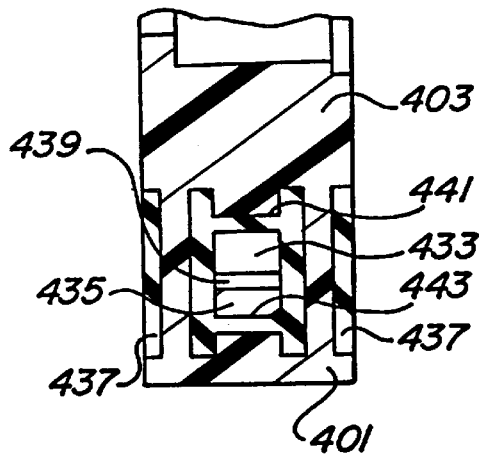
FIG. 31 is a diagrammatic cross-sectional view showing a third alternate embodiment of a rotatable apparatus of the present invention.

In FIG. 30, sets of radially oriented and flexible spokes integrally bridge between hub 403 and rim 401 on either side of a web 4 and rib 435. The embodiment of FIG. 31 is similar to the embodiment of FIG. 30 except a plurality of laterally oriented passageways 441 and 443, respectively extend through web 433 and rib 435 within which elastomeric material 437 is molded. This provides for additional interlocking of the elastomeric material to the hub and rim. It should further be noted that although a gap 439 is present between web 433 and rib 435. It is also envisioned that such a gap may be filled with elastomeric material in this embodiment.

Figure 32:
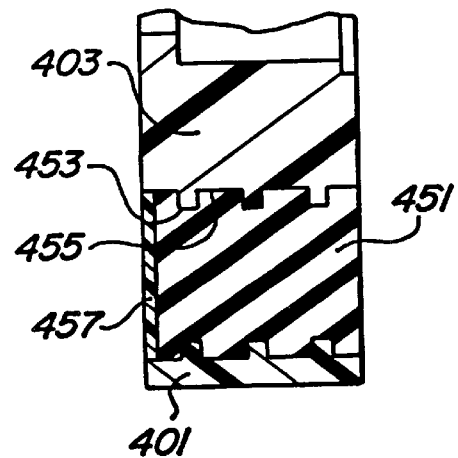
FIG. 32 is a diagrammatic cross-sectional view showing a fourth alternate embodiment of a rotatable apparatus of the present invention.
Figure 33:
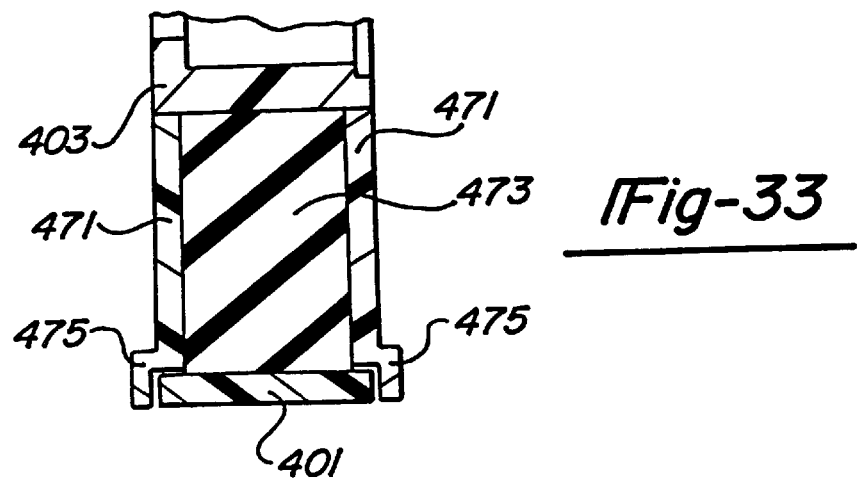
FIG. 33 is a diagrammatic cross-sectional view showing a fifth alternate embodiment of a rotatable apparatus of the present invention.
Figure 34:
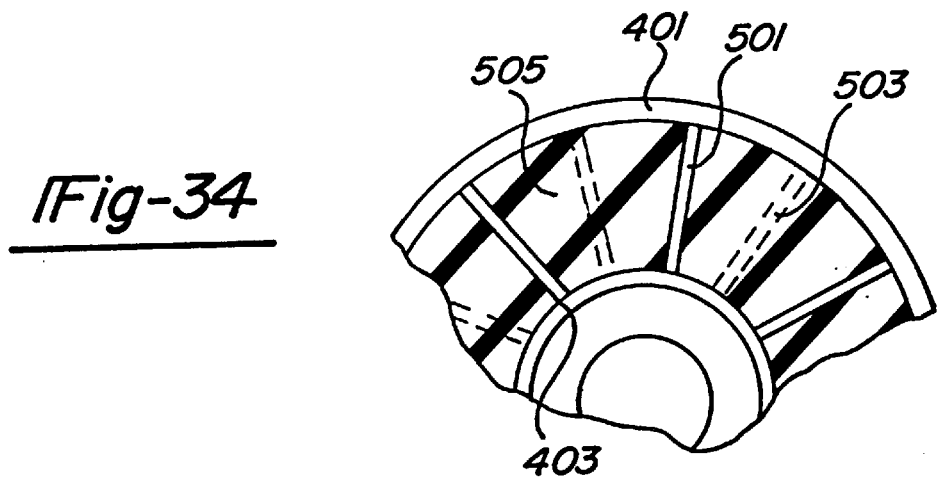
FIG. 34 is a diagrammatic side elevational view showing a sixth alternate embodiment of a rotatable apparatus of the present invention.
Figure 35:
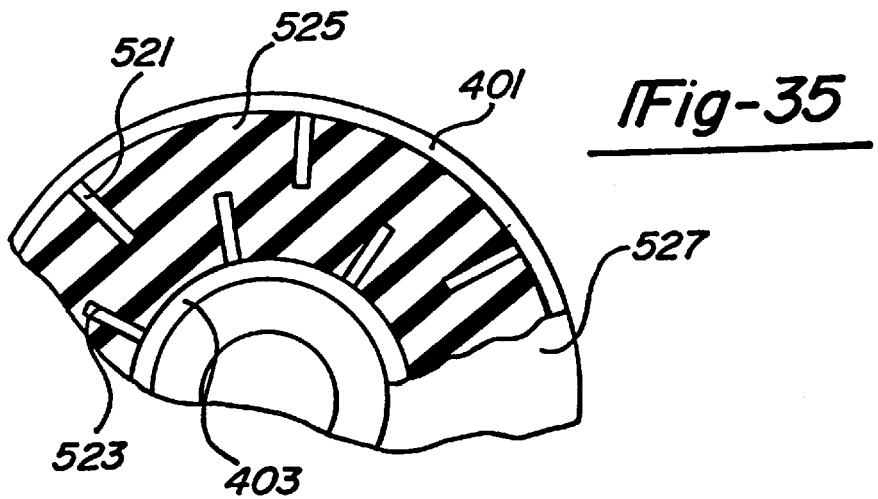
FIG. 35 is a diagrammatic side elevational view showing a seventh alternate embodiment of a rotatable apparatus of the present invention.

For the fourth alternative embodiment disclosed in FIG. 32, elastomeric material 451 is molded to engage with projections 453 and recesses 455 of hub 403 and rim 401. One or more anti-buckling plates 457 are also employed. FIG. 33 shows a fifth alternate embodiment wherein a pair of anti-buckling plates 471, bordering an elastomeric material 473, each have an offset end 475 for vertically supporting rim 401. FIG. 34 illustrates two sets of offset spokes 501 and 503 radially spanning between hub 403 and rim 401. An elastomeric material 505 is disposed between each spoke. It may further be desirable to have one or more anti-buckling plates in combination with this arrangement. A seventh alternate embodiment is illustrated in FIG. 35 wherein radially straight and offsets of spokes or nodules 521 and 523 project respectively from rim 401 and hub 403. An elastomeric material 525 is disposed therebetween. Also one or more anti-buckling plates 527 radially span between hub 403 and rim 401.

An eighth alternate embodiment of the present invention rotatable apparatus is shown in FIG. 36. Stress dissipation gear 901 has a gear toothed rim 903, a hub 905 and a stress dissipating structure 907. Stress dissipating structure 907 is further defined by a plurality of rotatably deformable shaft formations, nodules or spokes 909 which outwardly radiate from hub 905. Oppositely staggered therefrom, a plurality of triangularly shaped shaft formations, nodules or spokes 911 radially project inward from rim 903. Spokes 909 have a substantially rectangular, hexahedron shape with the bottom side attached to hub 905. Accordingly, spokes 911 compress an elastomeric material 913 against spokes 909 when there is differential rotational movement between rim 903 and hub 905. Elastomeric material 913 further serves to retain rim 903 to hub 905. In addition, various anti-buckling plates may also be included. These spoke shapes are advantageous in that a constant radial dimension is provided between spokes 909 and spokes 911. Thus, stress is applied uniformly between each adjacent spoke pair.

As is illustrated in FIGS. 37 and 38, a ninth alternate embodiment of a stress dissipation gear 1001 of the present invention has an integrated spur gear 1003 and pinion gear 1005, both sharing a common rotational axis and hub 1007. A gear toothed rim 1009 of spur gear 1003 is diametrically larger than a gear toothed rim 1011 of pinion gear 1005. A stress dissipating structure 1013 is comprised of a plurality of outwardly radiating spokes or nodules 1015 and a plurality of inwardly radiating spokes or nodules 1017. Spokes 1015 and 1017 are preferably constructed in a manner similar to that of the immediately prior embodiment, however, the spokes, stops or web and rim constructions of other embodiments may be alternately employed. Stress dissipating structure 1013 further includes an elastomeric material 1019 located between hub 1007 and rims 1009 and 1011. A pair of anti-buckling plates 1021 and 1023, similar to those previously disclosed heretofore, are also used this integrated spur and pinion gear construction significantly reduces the conventional multitude of individual parts which must traditionally be assembled. Thus, a cost and labor savings is achieved in addition to more consistent and uniform performance. One skilled in the art would also appreciate that additional gears or shafts or other such rotatable members may be integrated into the present exemplary embodiment gear 1001.

It should be appreciated that the present invention represents a significant quality improvement by reducing internal gear, sprocket, clutch and other rotatable member stresses due to startup shocks, shut-down shocks, overload and cyclical fatigue. The stress dissipating structure absorbs and dissipates many of the stresses created between the hub and rim such that the hub and the rim are allowed to temporarily rotate to a predesigned degree independent from one another. The present invention is also advantageous over conventional rotatable apparatuses since the present invention stress dissipation structures are easily tunable or adjustable by modifying the shapes or materials used in their creation. Furthermore, the present invention devices are more cost effective to produce and assemble due to fewer components than various conventional stress dissipation systems. It is significant that any of the stress dissipation structures disclosed herein, and even those of the parent patent applications upon which priority is based, can be used in combination with any of the other embodiments disclosed herein.

Figure 39:
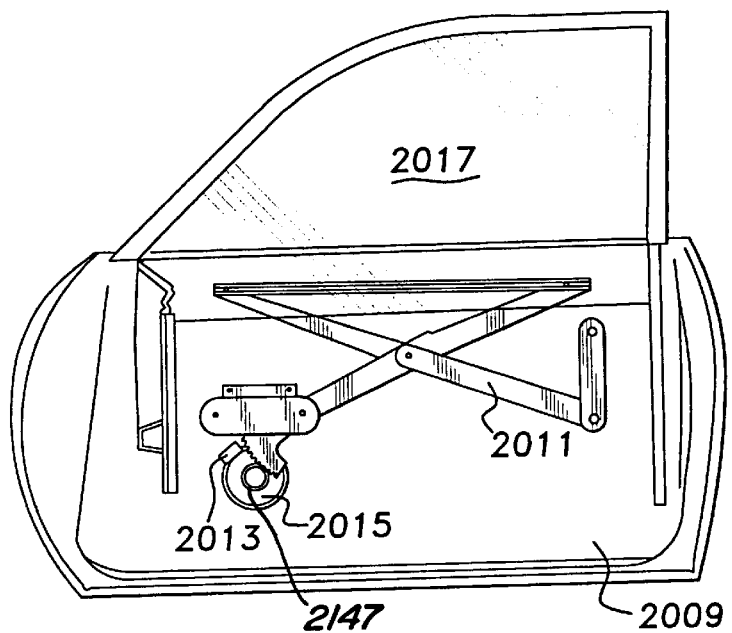
FIG. 39 is a diagrammatic side elevational view showing another preferred embodiment of a stress dissipation apparatus of the present invention employed in an automotive vehicle window lift mechanism.

Another preferred embodiment of a stress dissipation apparatus of the present invention can be employed in combination with an automotive vehicle door 2009 window lift regulator or mechanism 2011 as is shown in FIG. 39 In this window lift application, the stress dissipation apparatus includes a fractional horsepower dc electric motor 2013 which drives a driven gear 2015 coupled to a scissor arm linkage. The scissor arm linkage raises and lowers a window 2017 coupled thereto. The stress dissipation apparatus of the present invention can also be employed with other types of automotive window lift mechanisms such as, for example, that disclosed within the following U.S. Pat. No. 5,351,443 entitled "Automotive Door with Window Pane Lifter Module" which issued to Kimura et al. on Oct. 4, 1994; U.S. Pat. No. 5,255,470 entitled "Vehicle Door Glass Regulator" which issued to Dupuy on Oct. 26, 1993; U.S. Pat. No. 5,226,259 entitled "Automotive Door with Power Window" which issued to Yamagata et al. on Jul. 13, 1993; U.S. Pat. No. 4,222,202 entitled "Automotive Tape Drive Window Regulator" which issued to Pigeon on Sep. 16, 1980; and U.S. Pat. No. 3,930,339 entitled "Window Regulator, Especially for Automobiles, with a Threaded Cable Moving in a Guide" which issued to Jander on Jan. 6, 1976; all of which are incorporated by reference herewithin.

Figure 40:
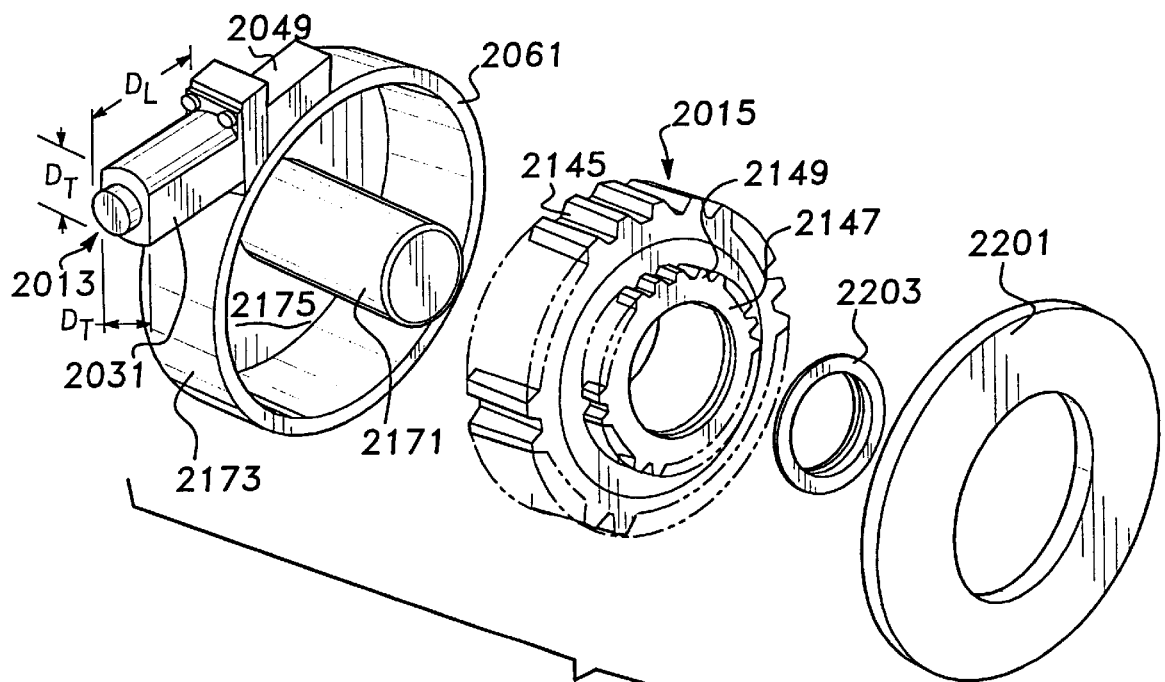
FIG. 40 is a partially exploded perspective view showing the preferred embodiment of the present invention stress dissipation apparatus.
Figure 41:
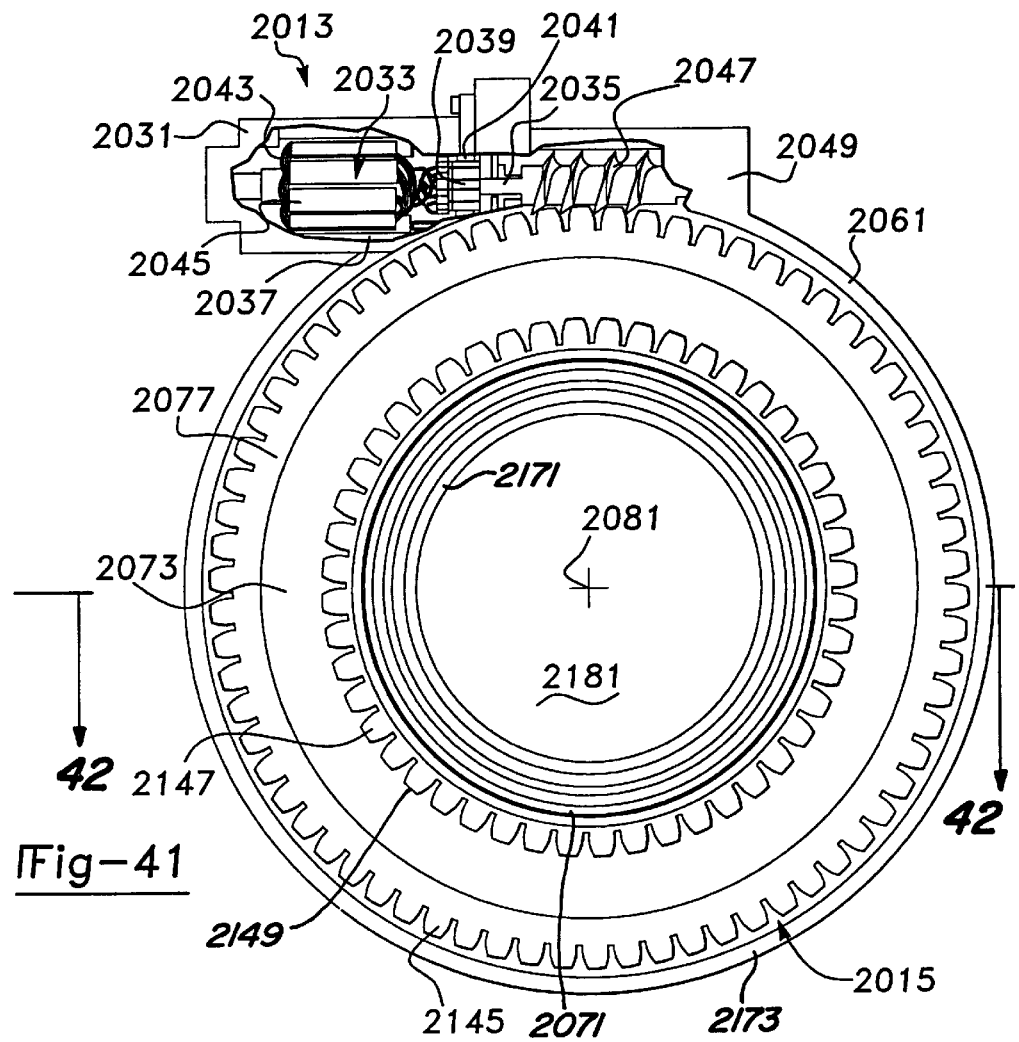
FIG. 41 is a side elevational view showing the preferred embodiment of the present invention stress dissipation apparatus of FIG. 39, with portions broken away therefrom.

Now referring to FIGS. 40 and 41, electric motor 2013 includes an armature or motor housing 2031, an armature 2033, an armature shaft 2035, permanent fixed magnets 2037, a commutator 2039 and a brush card assembly 2041. Armature 2033 includes copper wire windings 2043 wrapped inside of a plurality of armature pack slots which are juxtaposed between a plurality of magnetically conductive armature teeth 45. A helically wound worm gear portion 2047 is located upon armature shaft 2035. Worm gear portion 2047 is juxtaposed within a worm housing portion 2049 of a driven gear housing 2061. Armature housing 2031 has a longitudinal dimension "$D_L$" and transverse dimensions "$D_T$." When electric motor 2013 is installed in door 2009 (see FIG. 39), the crossbar transverse dimension of motor 2013, the lateral direction of driven gear housing 2061 and the lateral direction of driven gear 2015, are all taken in a direction that is perpendicular to the plane of the side views shown in FIGS. 41 and 42.

While electric motor 2013 may have a variety of configurations and components, the electric motor illustrated as part of the present invention stress dissipation apparatus has similar characteristics to that disclosed in U.S. Pat. No. 5,440,186 entitled "Motor with Isolated Brush Card Assembly" which issued to Forsell et al. on Aug. 8, 1995, and is also incorporated by reference herewithin. However, as will be further discussed hereinafter, the electric motors of the present invention and of U.S. Pat. No. 5,440,186 have significantly differing sizes and weights due to the driven stress dissipating gear 2015 and driven gear housing constructions of the present invention.

Figure 42:
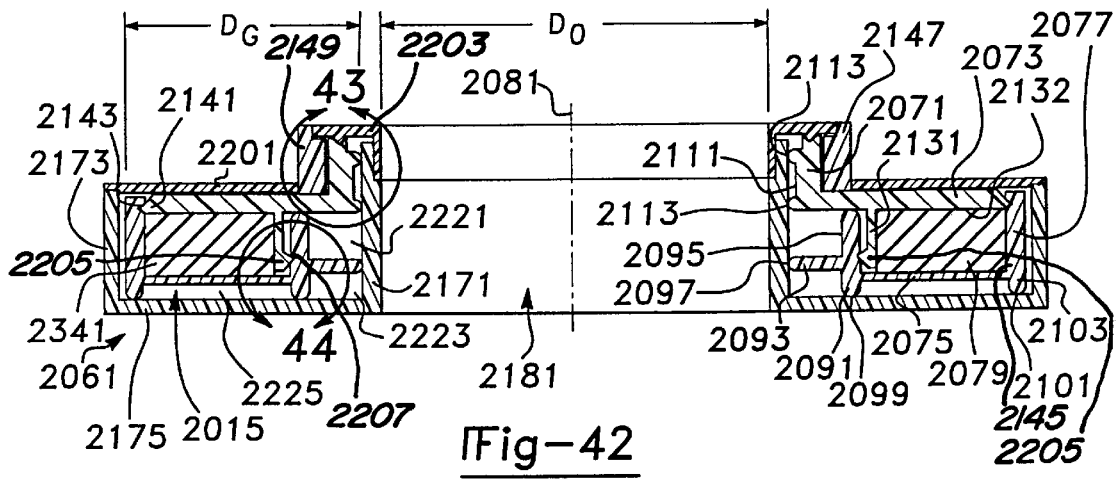
FIG. 42 is a cross sectional view, taken along line 42—42 of FIG. 41, showing the preferred embodiment of the present invention stress dissipation apparatus of FIG. 39.

Referring to FIGS. 41 and 42, driven stress dissipation gear 2015 includes a hub 2071, a first annular anti-buckling plate 2073, a second annular anti-buckling plate 2075, a rim 2077 and a rotational stress dissipation device 2079. All of these driven gear elements rotatably surround a driven gear rotational axis 2081. First anti-buckling plate 2073 is integrally molded as part of a laterally offset wall of hub 2071 while second anti-buckling plate 2075 is integrally molded as part of a section of rim 2077. An auxiliary hub 2091 is integrally formed from an end of second anti-buckling plate 2075 opposite that of an edge adjoining rim 2077. Lateral edges of auxiliary hub 2091 are provided with rounded corners to minimize surface area contact against the adjacent first anti-buckling plate 2073 and driven gear housing 2061. A radially projecting annular foot 2093 inwardly depends from a median portion of an auxiliary hub internal surface 2095. A curved edge 2097 of foot 2093, curved edge 2099 of auxiliary hub 2091, and a curved end 2101 of a finger 2103 laterally project from rim 2077 and act as bearing surfaces against driven gear housing 2061. An inner surface 2111 of hub 2071 also has a pair of curved fingers 2113 which act as bearing surfaces against driven gear housing 2061.

Figure 44:
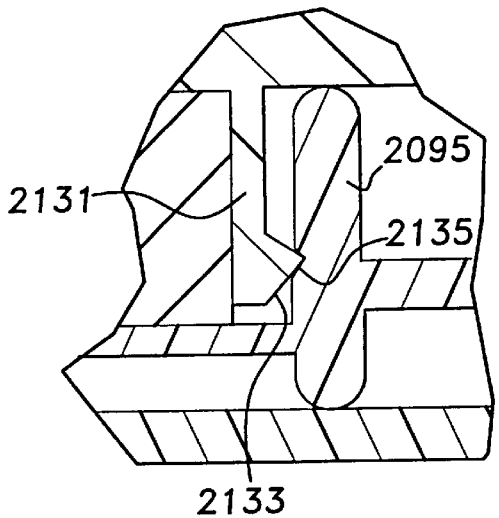
FIG. 44 is an enlarged sectional view, taken within circle 44—44 of FIG. 42, showing another snap-fit attachment employed with the preferred embodiment of the present invention stress dissipation apparatus in FIG. 39.
Figure 45:
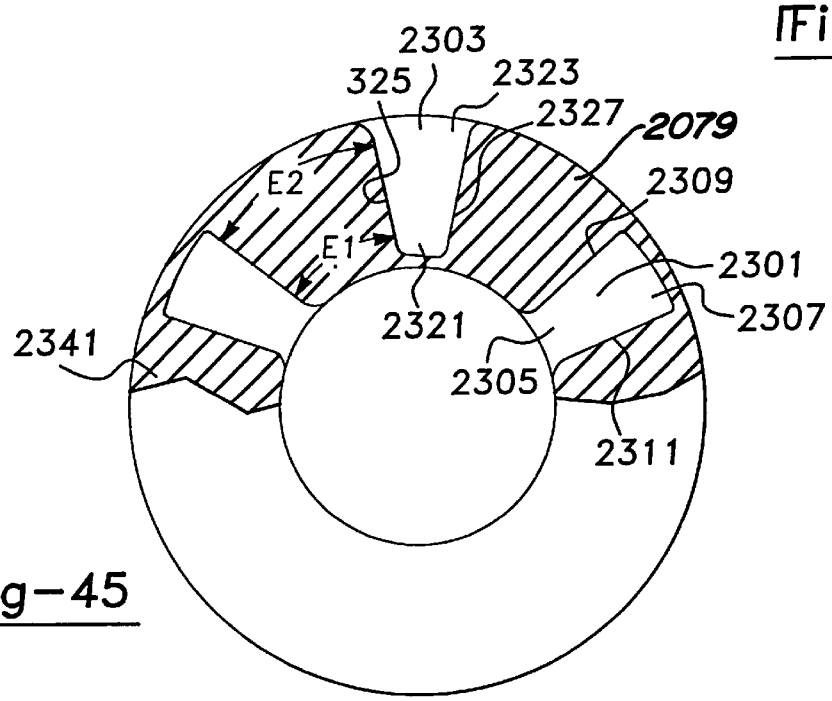
FIG. 45 is a diagrammatic side elevational view showing the relationship of nodules within the preferred embodiment stress dissipation apparatus of the present invention of FIG. 39.

A generally cylindrical leg 2131 inwardly extends, in a lateral direction, from an inside face 2132, of first anti-buckling plate 2073. A pointed barb 2133, outwardly extending from a distal end of leg 2131, engages a V-shaped receptacle 2135 disposed in auxiliary hub 2091. Barb 2133 and receptacle 2135 achieve a snap-fit attachment between anti-buckling plates 2073 and 2075. This can best be observed by reference to FIG. 44.

Returning to FIG. 42, an outer edge 2141 of first anti-buckling plate 2073 is placed in snap-fit engagement within a V-shaped receptacle 2143 of rim 2077. Thus, first anti-buckling plate 2073 is prevented from laterally moving relative to rim 2077 while first anti-buckling plate 2073 can be rotated somewhat independently of rim 2077.

As can be observed in FIGS. 40 and 41, rim 2077 has a set of geared teeth 2145 outwardly projecting therefrom for engagement with worm gear portion 2047 of motor 1203. Additionally, as is shown in FIGS. 40 through 2043, a steel pinion gear 2147, having outwardly extending spur gear teeth 2149, is pressfit or otherwise affixed upon an outer surface 2151 of hub 2071. A knurled pattern may be provided upon an interior surface of pinion gear 2147 to ensure proper frictional engagement with hub 2071. Pinion gear 2147 may also be attached to hub 2071 through sonic welding, remelting of the hub through pinion gear heating or the like. Hub 2071, first anti-buckling plate 2073, second anti-buckling plate 2075 and rim 2077 are all preferably injection molded from an engineering grade thermoplastic material such as polyacetyl, a modified PBT, or a modified polyamide.

Figure 43:
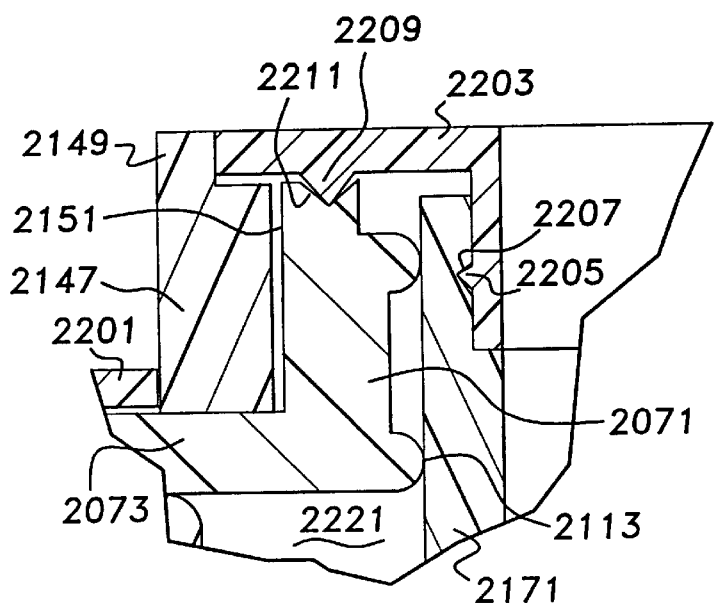
FIG. 43 is an enlarged sectional view, taken within circle 43—43 of FIG. 42, showing snap-fit attachments employed with the preferred embodiment of the present invention stress dissipation apparatus of FIG. 39.

FIGS. 40, 42 and 43 illustrate driven gear housing 2061 as being an injection molded engineering grade material (or alternately, suitable die cast metals such as zinc, aluminum or magnesium) with a cup-shaped cross section defined by a generally cylindrical interior wall 2171, a generally cylindrical exterior wall 2173 and a generally annular bottom wall 2175. An inner surface of interior wall 2171 defines a substantially cylindrical opening 2181. As can be observed in FIG. 4, cylindrical opening 2181 has a diameter "$D_O$" relatively larger than a radial distance "$D_G$" of one side of the gear (i.e., the difference between the radii of the rim and the hub). Therefore, even though the present invention gear has a much larger outer diameter as compared to conventional gears, the enlarged cylindrical opening 2181, coupled with a slightly thinner lateral dimension in combination with a proportionally reduced motor size, result in overall weight reduction as compared to conventional gears and drives.

Returning again to FIGS. 40, 42 and 43, an injection molded polymeric cover plate 2201, having an annular configuration, is screwed onto flanges (not shown) with bosses extending from exterior wall 2173 of driven gear housing 61. A flexible moisture seal, such as a nylon or teflon O-ring may be employed between an inner edge of cover plate 2001 and the adjacent anti-buckling plate 2073. An injection molded polymeric retaining plate 2203 is attached to interior wall 2171 of driven gear housing 2061 through a pointed snap-fit barb 2005 disposed along a side leg mating with a V-shaped receptacle 2007. Along an adjoining perpendicular top leg of retaining plate 2003, there is a laterally oriented and pointed snap-fit barb 2009 which slidably engages into a V-shaped receptacle 2011 of a distal edge of hub 2071. A sealing O-ring or the like may be provided between retaining plate and driven gear housing 2161 or between retaining plate 2003 and hub 2171.

Within the gear, a hollow and substantially annular cavity 2021 is bordered by first anti-buckling plate 2073, auxiliary hub 2091 of second anti-buckling plate 2075, foot 2093 of second anti-buckling plate 2075 and interior wall 2171 of driven gear housing 2061. Other hollow and annular cavities 2023 and 2025 are also provided between portions of second anti-buckling plate 2075 and driven gear housing 2061. All of these cavities further contribute to the weight reduction achieved by the present invention system while also allowing for their bordering plate segments to act as a strong box-like structure.

Figure 7:
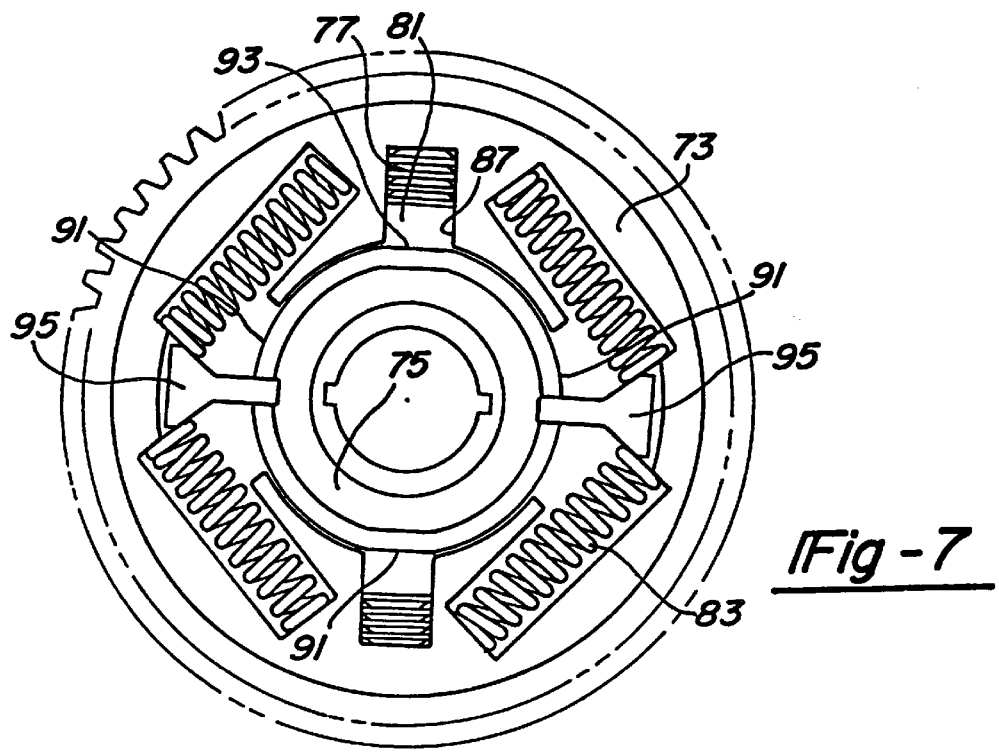
FIG. 7 is a side elevational view showing the second preferred embodiment rotatable apparatus of the present invention in a nominal position.
Figure 8:
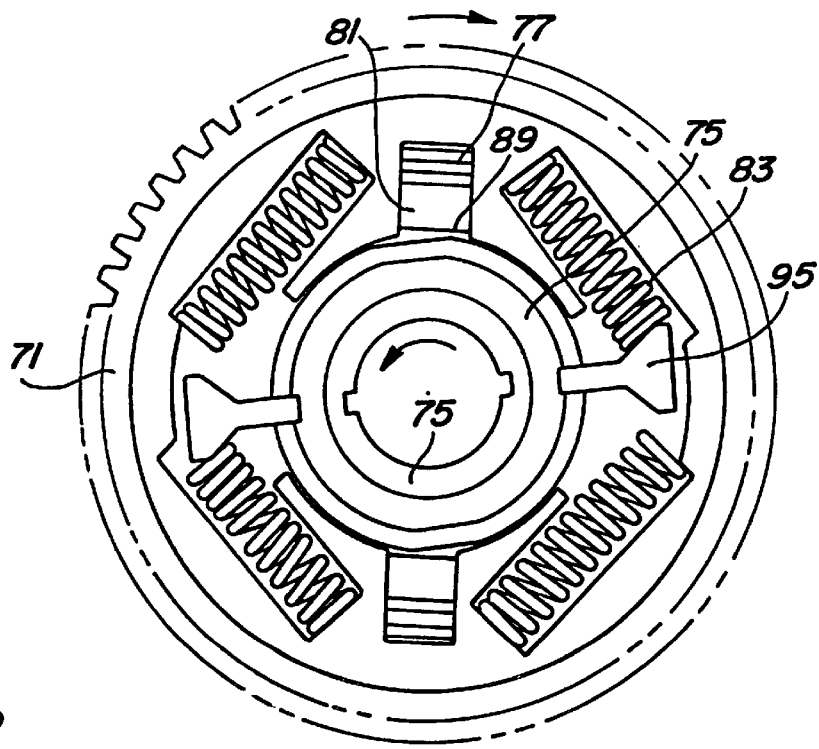
FIG. 8 is a diagrammatic side elevational view showing the second preferred embodiment rotatable apparatus of the present invention in a stress dissipating position.

Rotational stress dissipation device 2079 is best illustrated in FIGS. 4 and 7. A first set of nodules 2301 radially extends outward from an inner member defined as either a modified form of the hub or the first anti-buckling plate. A second set of nodules 2303 radially extends inward from an outer member defined as the rim or the second anti-buckling plate. Each first nodule 2301 has a proximal end 2305 with a relatively constricted rotational direction dimension as compared to an expanded rotational direction dimension disposed at a distal end 2307. Tapered surfaces 2309 and 2311 extend between the proximal and distal ends.

Second nodules 2303 have a distal end 2321 with a relatively constricted rotational direction dimension as compared to an expanded rotational direction dimension disposed at a proximal end 2323. Tapered surfaces 2325 and 2327 extend between the proximal and distal ends. An elastomeric material 2341 such as Santoprene® 55 acts as a resilient member disposed between the first and second sets of nodules 2301 and 2303, respectively, for reducing differential rotational movements between the hub and rim. Elastomeric material 2341 can be injection molded or, alternately, reaction injection molded in-place with the hub and rim preassembled or elastomeric material 2341 can be separately molded and then manually inserted between the hub and rim. While the resilient member is preferably shown as being elastomeric material, it may alternately comprise springs, flexible spokes or the like. The design structure employed with the present invention allows for utilization of increased diameter driven and pinion gears in combination with smaller electric motors. This results in overall reduced weight and provides for improved dynamics with worm gear, driven gear and pinion gear speeds being drastically reduced. These reduced gear speeds provide for, in addition to other things, reduced wear, quietness and shock loads.

The amount of taper of each of the nodules and the amount of elastomeric material ("E") disposed between each pair of adjacent nodules can be generally characterized by the following formula:

$$\frac{E_2}{E_1} = \frac{D_2}{D_1}$$

where $E_2$ is a rotational direction dimension between the proximal end of one of the second set of nodules and the distal end of an adjacent one of the first set of nodules;

$E_1$ is a rotational direction dimension between the distal end of the one of the second set of nodules and the proximal end of the adjacent one of the first set of nodules;

$D_2$ is a diameter of the rim teeth; and $D_1$ is a diameter of the hub teeth;

whereby generally uniform strain is imparted upon the elastomeric material during deformation due to differing rotational movement between the rim and the hub.

An alternate embodiment enlarged diameter driven gear can also be employed in combination with the reduced size motor. In this embodiment a single web spans between an integrally formed hub and web. Thus, the hub, web and rim all rotate the same amount as a solid gear. Due to the enlarged driven and pinion gear diameters, a stress dissipating structure may not be required since the gears will rotate at significantly slower speeds and thus be less susceptible to shocks and stress. Since the cylindrical opening within the driven gear housing is of a large size, overall part weight is minimized. The driven and pinion gears can be die cast from a metallic material or can be injection molded from a reinforced nylon or reinforced polyester polymeric material.

The following Table 1 sets forth the theoretical values and sizes of a selected present invention system as compared to an existing conventional automotive window lift system. It is significant to note that the total system weight reduction is 300 grams (approximately 30% less than conventional systems) while the overall system output torque is maintained. Thus, very significant efficiencies in power density are achieved (i.e., 61 inch-pounds per pound for traditional systems versus 91 inch-pounds per pound for one version of the present invention; this amounts to greater than 50% improvement) while the lateral size and system weight are reduced. Furthermore, due to the smaller motor size (e.g., requiring less copper wire windings, smaller permanent magnets and the like) very significant cost savings are also achieved.

TABLE 1

| | CONVENTIONAL SYSTEM | PRESENT INVENTION SYSTEM |
|---|---|---|
| Electric Motor and Armature Housing | Weight = 525 grams* Armature housing length = 2¾ inches ($D_L$) × 2 inches ($D_T$) Worm RPM = 6000–8000 Motor horsepower = 0.25 | Weight = 200 grams* Armature housing size = 1½ inches ($D_L$) × 1½ inches ($D_T$) Worm RPM = 2400 Motor horsepower = 0.041 |
| Worm Gear Portion and Worm Housing and Driven Gear Housing | Driven gear housing diameter = 2.5 inches Weight = 275 grams | Driven gear diameter = 4.8 inches Weight = 325 grams |
| Driven Gear | Diameter = 2.4 inches Weight = 95 grams | Diameter = 4.9 inches Weight = 45 grams |
| Pinion Gear | Diameter = 9/16 inch Weight = 30 grams | Diameter = 4 inches Weight = 55 grams |
| System Torque | 125 inch-pounds | 125 inch-pounds |
| Total Weight | 925 grams | 625 grams |

The following formulas, Table 2, and discussion thereafter, are designed to allow one skilled in the art to utilize the present invention in systems having various sized driven gears, pinion gears and output torques:

Horsepower=[(Torque)(RPM)]/Constant

Horsepower=[(Torque)(RPM)]/63025, where torque is measured in inches-pounds.

Torque=(Distance)(Force).

TABLE 2

| EXEMPLARY GEAR NO. | 1 | 2 | 3 | 4 | 5 | 6 |
|---|---|---|---|---|---|---|
| WEIGHT (GRAMS) | 925 | 775 | 725 | 750 | 625 | 575 |
| WINDOW SPEED* (FEET/MINUTE) | 20 | 20 | 20 | 20 | 20 | 20 |
| PINION GEAR** RPM | 125 | 625 | 62.5 | 27.7 | 20.8 | 13.3 |
| PINION GEAR** NO. OF TEETH | 9 | 18 | 18 | 32 | 54 | 72 |
| DRIVEN GEAR - RPM | 125 | 62.5 | 62.5 | 27.7 | 20.8 | 13.3 |
| DRIVEN GEAR DIAMETER (INCHES) | 2.4 | 2.4 | 2.4 | 3.6 | 4.8 | 6.0 |

TABLE 2-continued

| EXEMPLARY GEAR NO. | 1 | 2 | 3 | 4 | 5 | 6 |
|---|---|---|---|---|---|---|
| DRIVEN GEAR DIAMETER % INCREASE | — | 0 | 0 | 50 | 100 | 150 |
| WORM GEAR - RPM | 7200 | 3650 | 3600 | 2400 | 2400 | 1920 |
| MOTOR HORSEPOWER | 0.248 | 0.124 | 0.124 | 0.055 | 0.041 | 0.026 |
| PINION GEAR TORQUE (INCHES-POUNDS) | 125 | 125 | 125 | 125 | 125 | 125 |

The present invention system, which employs the enlarged diameter driven and pinion gears in combination with the reduced size motor, is also well suited for automotive vehicle powered moving panels such as door windows, sunroof windows, sliding minivan doors or the like. These powered moving panels must meet FMVSS 118 which mandates that the motor must stall at twenty-two pounds of force in order to prevent occupant finger pinching. Therefore, as can be observed in FIG. 46, an electrical current sensor 2408 is electrically connected to commutator 2039 of the motor by way of brushes for sensing if a sudden current rise is present (excluding initial energization and deenergization current spikes) which indicate that the closure force and motor torque has increased. Thus, the motor can be deenergized and/or reversed. Sensor 2408 can be a voltage divider, resistor or the like, which operates in conjunction with a mosfet or microprocessor electrically connected therewith. An enlarged diameter ("$D_{DG}$") of driven gear 2403 and an enlarged diameter of pinion gear 2405, shown in FIG. 46 as having a solidly and integrally formed hub 2407, laterally central web 2409 and rim 2411, allow for slower rotational speeds of the gears and commutator. These slower rotational speeds further provide the ability to more accurately sense motor induced current rises as a relation of time and panel movement distance. Depending upon the specific application, the larger diameter gears and smaller motor are sized in accordance with the theoretical calculations of Table 1.

Figure 46:
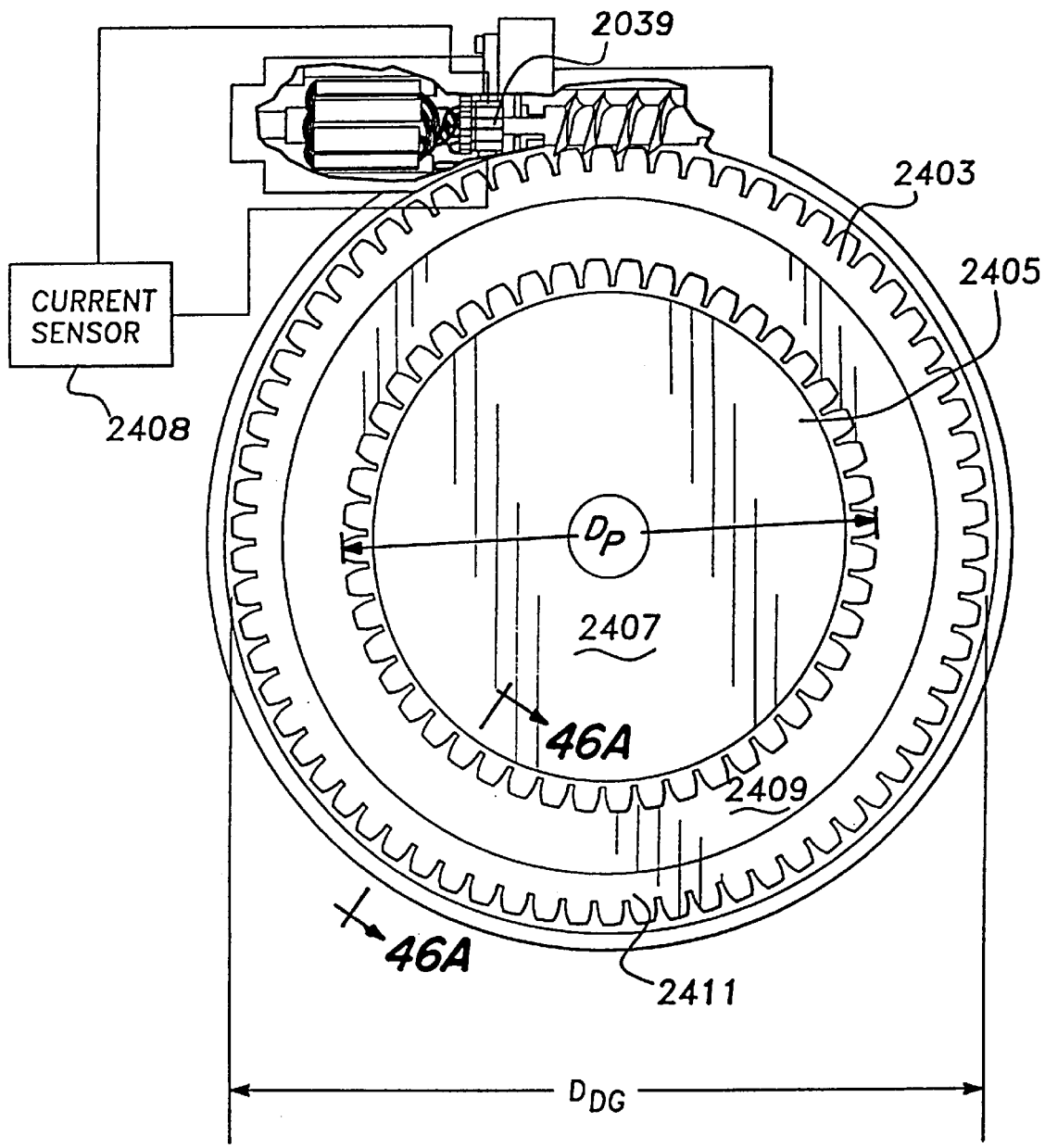
FIG. 46 is a diagrammatic view showing an alternate embodiment apparatus of the present invention.
Figure 46A:
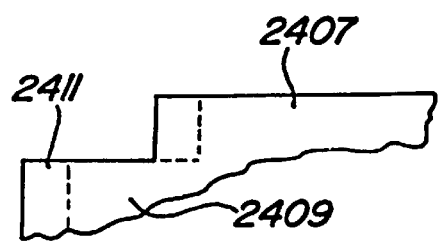
FIG. 46A is a fragmentary and cross sectional view, taken along line 46A—46A of FIG. 46, showing the alternate embodiment apparatus of the present invention.

Referring to FIGS. 40 and 46, the size relations of the driven gear and motor can be characterized as follows:

$D_{DG} < (1.5)(D_P)$, where "$D_P$" is the diameter of the pinion gear. Accordingly, an outer diameter of the driven gear is less than one and one-half times the outer diameter of the pinion gear while the relationship between the armature housing volume divided by the outer diameter of the driven gear is less than two inches squared. Although it is preferable to provide a large cylindrical opening 2181 (see FIG. 42) within the driven gear housing and hub in order to save weight, it is also envisioned that the presently discussed alternate gears may not necessarily need this opening to realize the size and speed relationships and advantages of the present invention.

While the preferred embodiments of this stress dissipation apparatus has been disclosed, it will be appreciated that various modifications may be made without departing from the present invention. For example, the nodule construction disclosed can be employed with other hub and rim configurations. Furthermore, the pinion gear teeth can be integrally formed upon the hub. Also, the hub need not be necessarily offset from the rim. A more centralized web may alternately be employed between the hub and rim, instead of outer anti-buckling plates, while harnessing the other novel aspects of the present invention. Many other snap-fit means, such as separated cantilevered beams, tongue and groove formations, dovetail formations, rounded barbs or squared barbs can also be provided. Various materials have been disclosed in an exemplary fashion, however, other materials may of course be employed. It is intended by the following claims to cover these and any other departures from the disclosed embodiments which fall within the true spirit of this invention.

Figure 47:
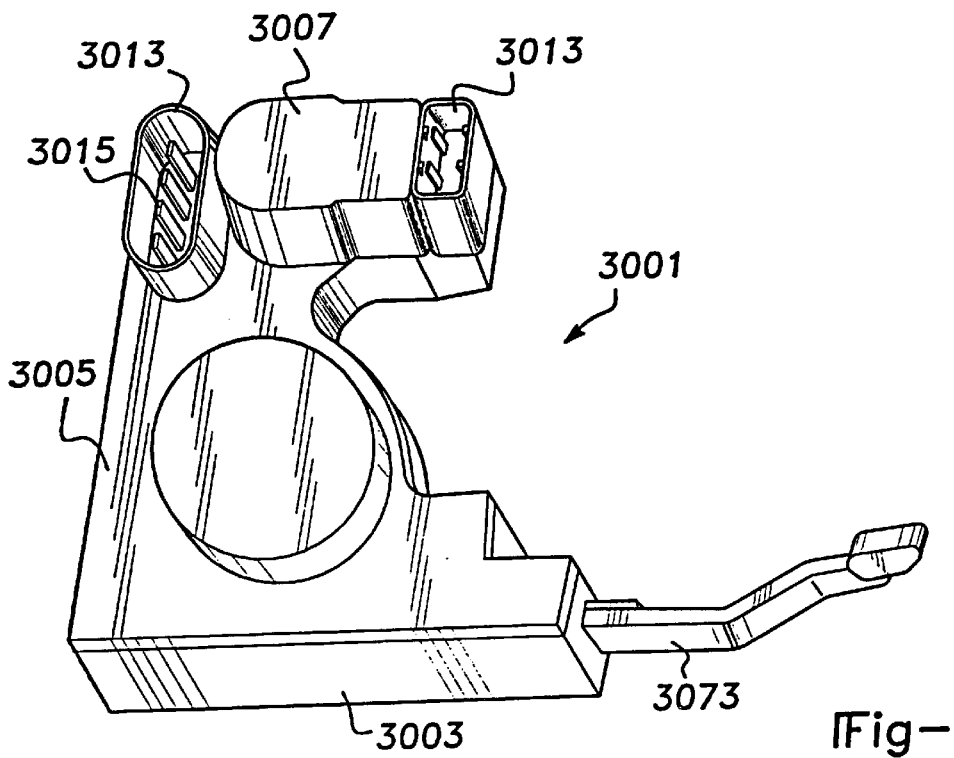
FIG. 47 is a perspective view showing another preferred embodiment of a door lock mechanism of the present invention.
Figure 48:
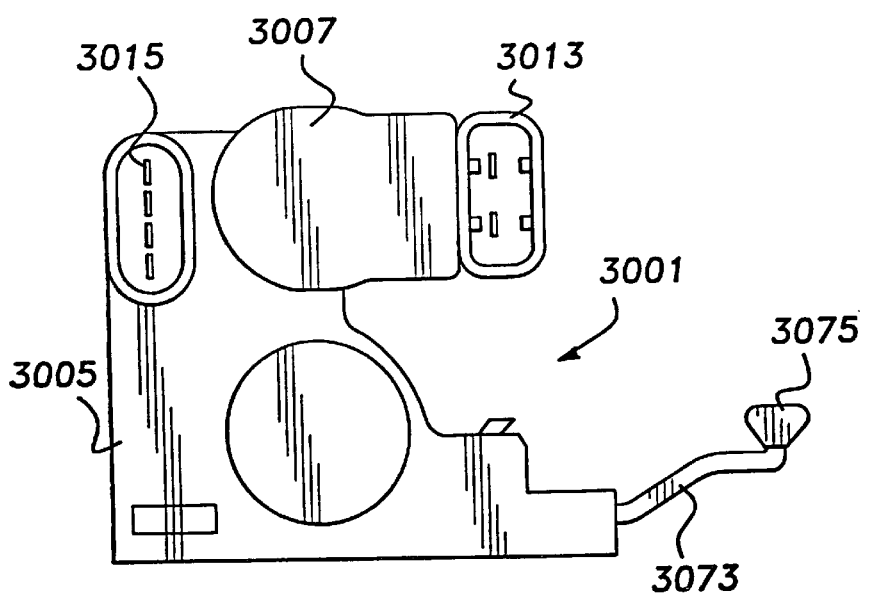
FIG. 48 is a side elevational view showing the preferred embodiment door lock mechanism of FIG. 47.
Figure 49:
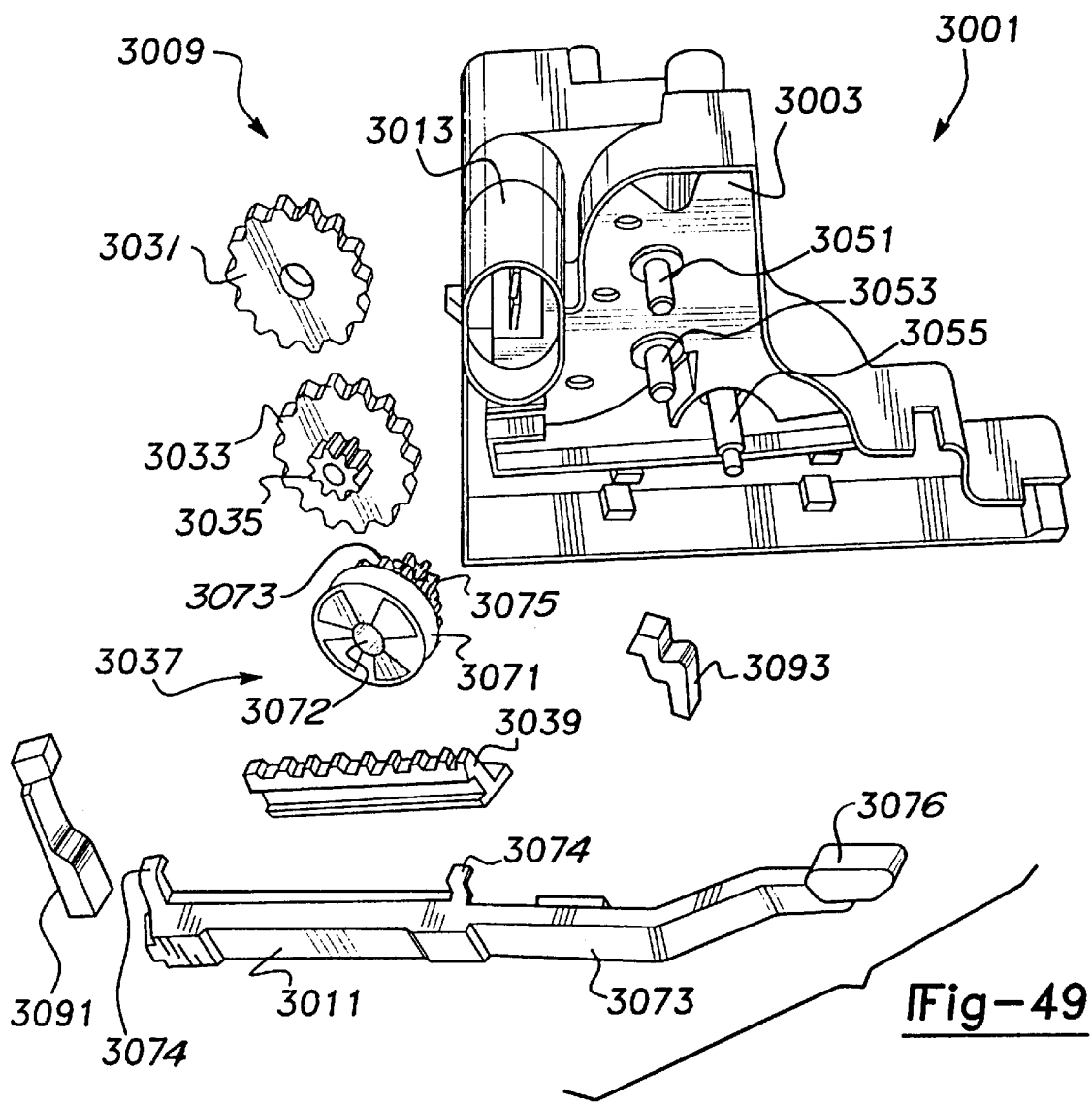
FIG. 49 is an exploded perspective view showing the preferred embodiment door lock mechanism of the present invention of FIG. 47.

A preferred embodiment of a door lock mechanism 3001 can be observed in FIGS. 47 through 49. Door lock mechanism 3001 is used in automotive vehicle doors. Door lock mechanism 3001 includes a housing 3003, a cover 3005, a fractional horsepower, dc electric motor 3007, a drive transmission 3009 and a latch 3011. Integrally electric connectors 3013 supply power to electric motor 3007 and to proximity or limit switches (not shown) by way of metal stampings 3015. Housing 3003 and cover 3005 are preferably injection molded from a polymeric or plastic material such as ABS and are held to each other by way of snap fits, sonic welding or the like.

Drive transmission 3009 includes a first gear 3031, a second gear 3033, a third smaller gear 3035 stacked on top of second gear 3033 in a coaxial manner for coincidental movement therewith, a rotatable stress dissipation member 3037, and a rack 3039. Gears 3031, 3033, 3005 and rack 3039 are all made from engineering grade polymeric materials such as nylon or acetyl. Gears 3031, 3033 and rotatable member 3037 are all journalled about their respective posts 3051, 3053 and 3055 inwardly projecting from housing 3003.

Stress dissipation rotatable member 3037 includes a toothless rim 3071 containing internally projecting nodules (see FIGS. 9 through 16). Rotatable member 3037 further includes a fourth gear 3073 integrally molded with and stacked upon rim 3071 for coincidental movement therewith. A set of internally projected nodules (see FIGS. 13–16) radially projects from rim 3071. A fifth pinion gear 3075 is coaxially stacked upon an anti-buckling plate (see FIG. 13) which has a hub and radially projecting modules. An elastomeric lever member (see FIG. 13) is disposed between the sets of nodules for allowing some differing rotational movement between gears 3073 and 3075 while dissipating stresses and reducing sudden movement within the drive transmission. Ultimately, any of these stress reduction members disclosed heretofore can be employed within this drive transmission.

Figure 50:
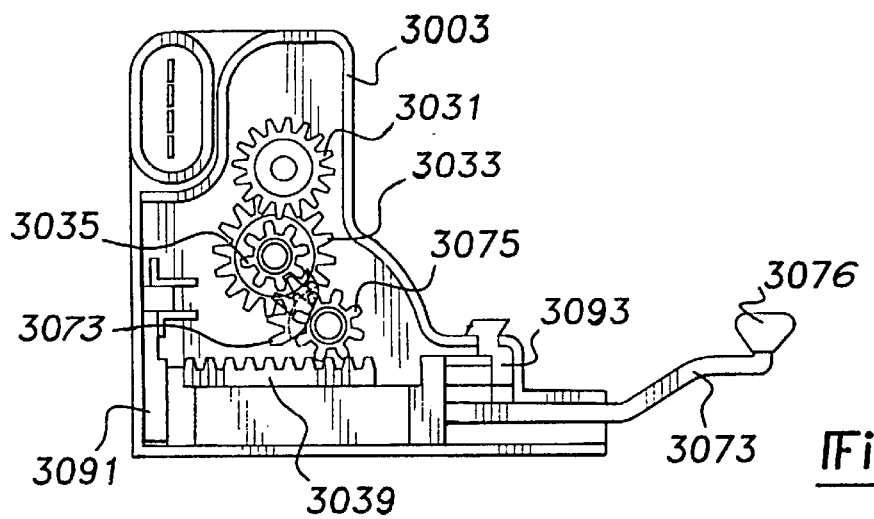
FIGS. 50 through 52 are side elevational views showing differing operational positions of components within the preferred embodiment door lock mechanism of the present invention of FIG. 47, with a cover removed.
Figure 51:
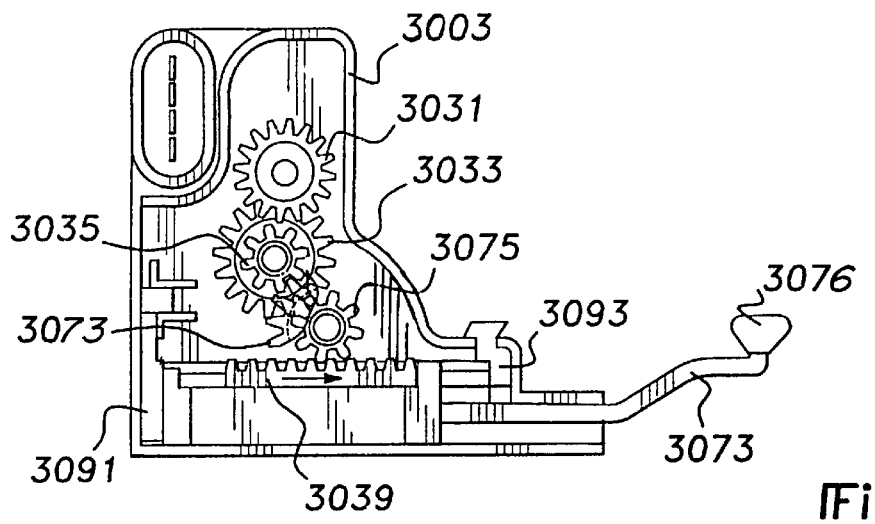
Figure 52:
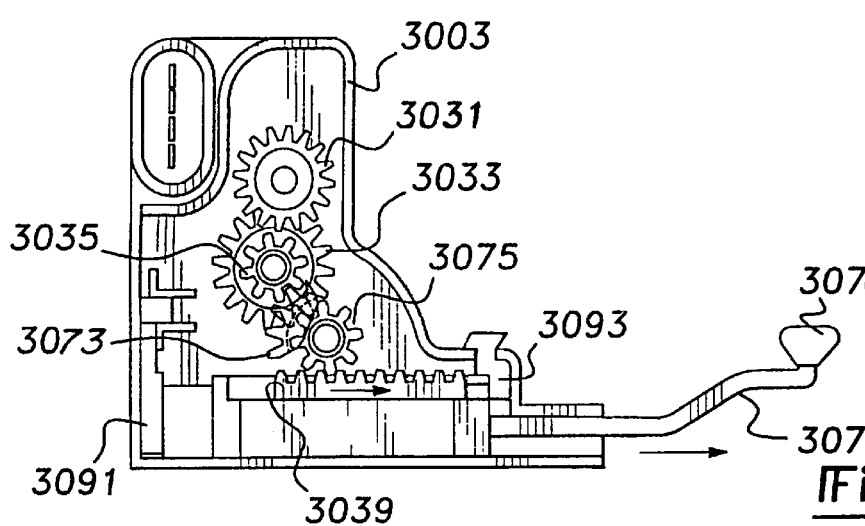

Lever 3011 further has a pair of arms 3071 and a leg 3073 with an elastomeric member 3076 and molded upon a distal thereof for engagement with a vehicle body pillar striker. Lever 3011 is preferably injection molded from an engineering grade from polymeric material As can be observed in FIGS. 50 through 52, motor 3007 has an output pinion gear (not shown) which engages and drives the teeth of first gear 3033. First gear 3031 is drivably enmeshed with second gear 3033 which, in turn, rotates third gear 3035. Third gear 3035 is drivably enmeshed with fourth gear 3073 which causes rim 3071 to rotate within the cylindrical cavity protruding from cover 3005. Rotational force is transferred from fourth gear 3073 and rim 3071 to fifth gear 3075 through the stress dissipating nodules and elastomeric member. Fifth gear 3075 directly drives the teeth of rack 3039. Rack 3039 exhibits lost linear motion, as can be viewed by comparing FIGS. 50 and 51, prior to concurrent linear movement of latch 3073 into and out of an aperture in a side of housing 3003. Rack 3039 abuts against fingers 3074 (see FIG. 49). A pair of elastomeric bumpers 3091 and 3093 cushion and limit the extreme linear movements of latch 3073. Thus, stress dissipation rotatable member 3037 significantly increases the durability and usage life of the drive transmission components within door lock mechanism 3001.

Figure 53:
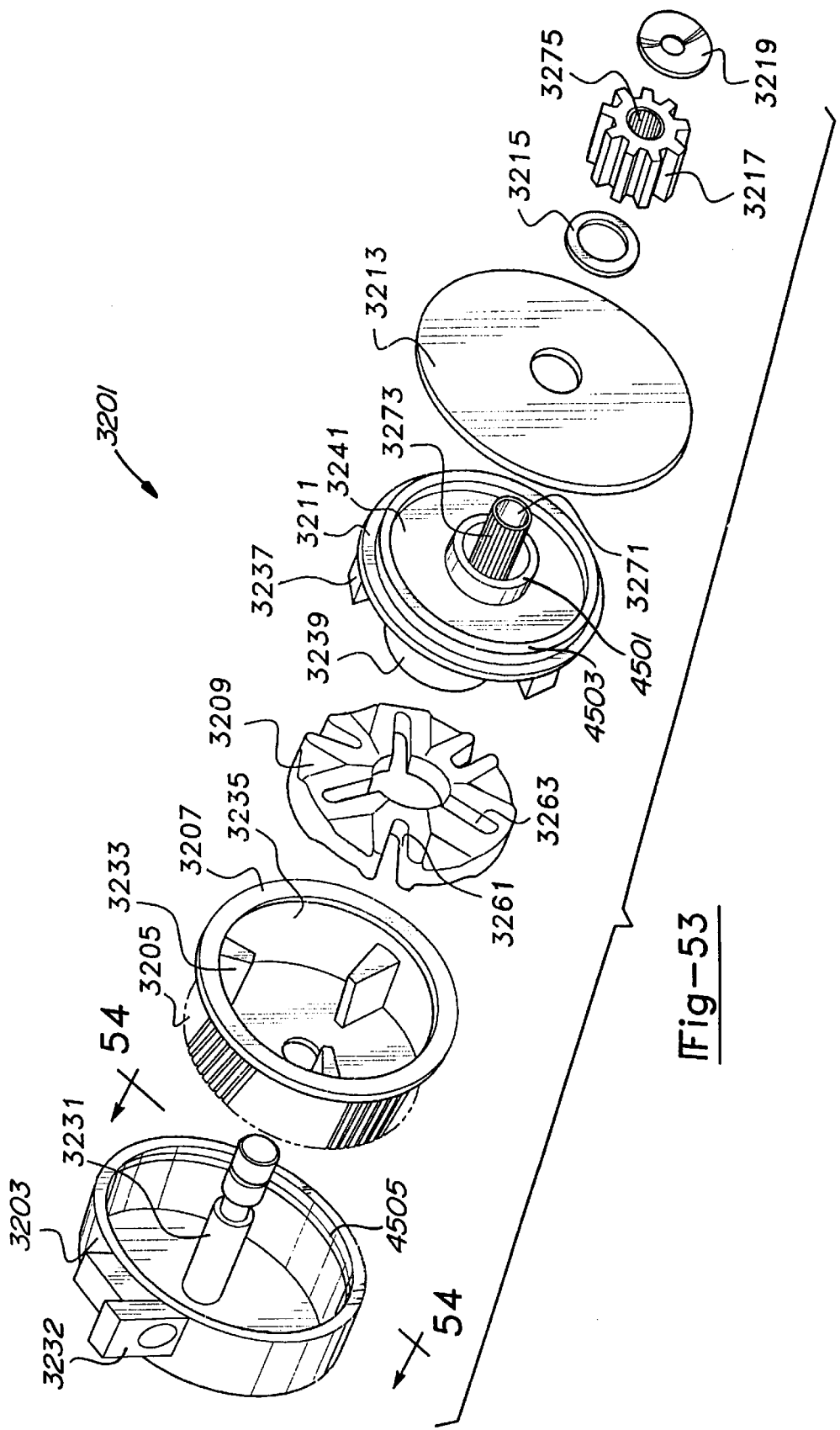
FIG. 53 is an exploded perspective view showing another preferred embodiment stress dissipation rotatable member of the present invention.
Figure 54:
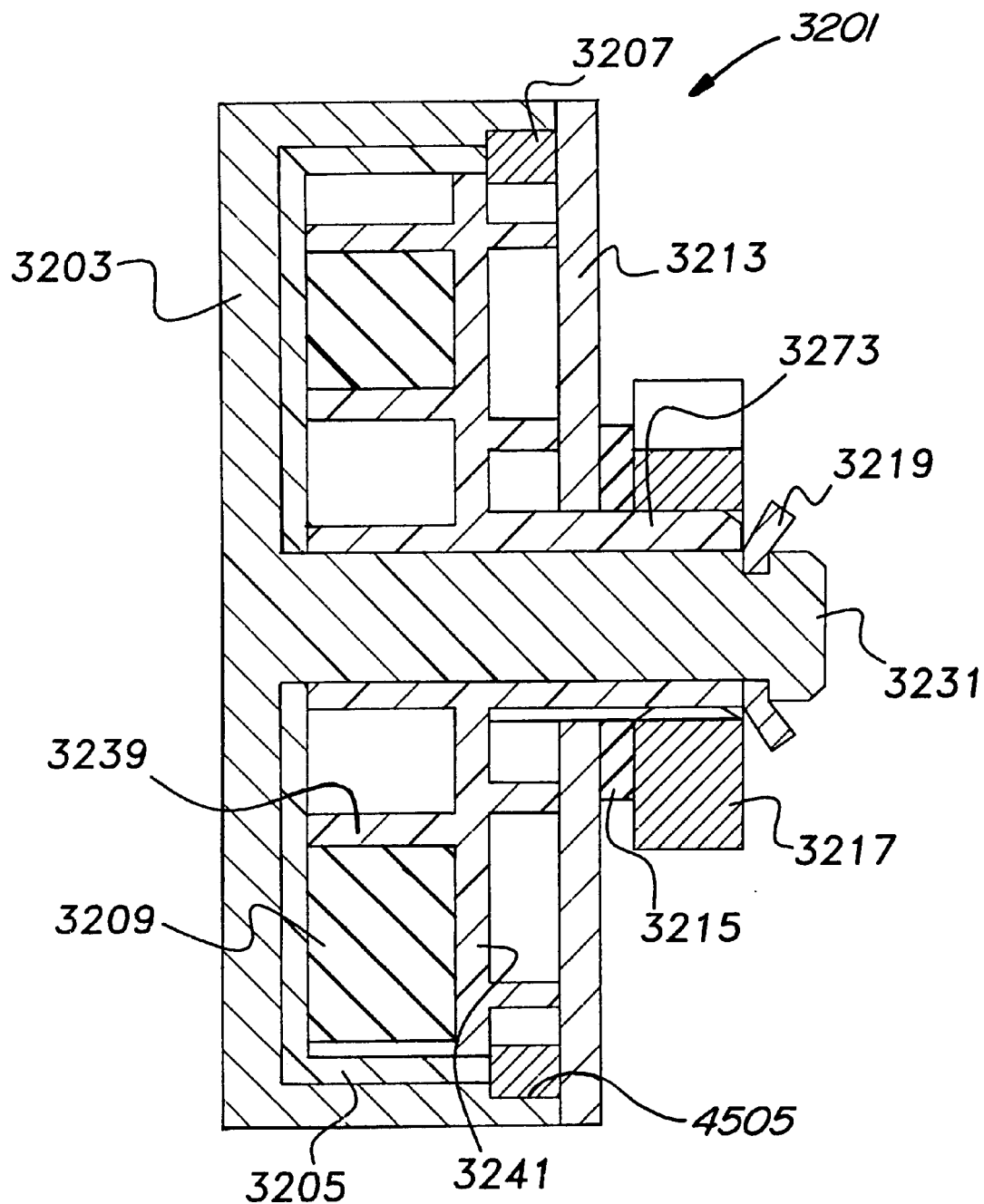
FIG. 54 is a sectional view, taken along line 54—54 of FIG. 53, showing the preferred embodiment stress dissipation rotatable member of the present invention of FIG. 53.

Referring now to FIGS. 53 and 54, another preferred embodiment of a stress dissipation rotatable member 3201 includes a gear housing 3203, an externally toothed rim 3205, a snap ring 3207, an elastomeric rubber member 3209, an anti-buckling plate/hub 3211, a cover 3213 a rubber O-ring 3215, a separate pinion gear 3217 and a push nut 3219. Housing 3203 further includes a central integrally molded post 3231. An armature shaft receptacle 3232 is formed as part of housing 3203. Rim 3205 further has three internally projecting nodules 3233 extending from an inner surface 3235. Similarly, anti-buckling plate/hub 3211 has three radially extending nodules 3237 outwardly extending from a hub portion 3239 and an inner face of anti-buckling plate portion 3241. Elastomeric member 3209 is disposed within rim 3205 such that nodules 3233 and 3237 engage with cut outs 3261 and 3263, respectively, as discussed with many of the prior embodiments (see FIG. 13). Inner and outer concentric rings, 4501 and 4503 respectively, integrally project from inner face 3241 of anti-buckling plate/hub 3211. Snap ring 3207 fits into a recess 4505 of housing 3203.

Additionally, an integrally molded polymeric, hollow collar or boss 3271 coaxially extends from an outer face of anti-buckling plate portion 3241. Boss 3271 has a series of external splines 3273 running parallel to the axial direction. A set of internal splines 3275 of metal gear pinion 3217 are press fit to engage with splines 3273. Frusto-conical push nut 3219 further edged to retain pinion gear 3217 upon collar 3271. This allows for secure engagement of dissimilar material parts while also providing the significant stress reduction features desired.

While the various embodiments of the stress reduction apparatus have been disclosed, it will be appreciated that various modifications may be made without departing from the present invention. It is intended by the following claims to cover these and any other departures from the disclosed embodiments which fall within the true spirit of this invention.

The invention claimed is:

1. A stress dissipation rotatable member comprising:
   a plate having a circular periphery;
   a boss coaxially protruding from an outer face of said plate;
   a separate pinion gear mounted upon and rotating with said boss;
   an annular rim; and
   a stress dissipation structure coupling said plate to said rim while also allowing some differing rotational movement therebetween.

2. The stress dissipation rotatable member of claim 1 wherein said stress dissipation structure includes resilient means for allowing some rotational movement differences between a rim and a hub.

3. The stress dissipation rotatable member of claim 2 wherein said resilient means further includes:
   a first set of nodules inwardly extending from said rim;
   a second set of nodules outwardly extending from said hub; and
   an elastomeric member disposed between said sets of nodules.

4. The stress dissipation rotatable member of claim 1 wherein said pinion gear is metal, said plate is plastic and said boss is plastic.

5. The stress dissipation rotatable member of claim 4 wherein said pinion gear is mounted upon said boss by way of enmeshed splines.

6. The stress dissipation rotatable member of claim 1 further comprising an electric motor having an output gear enmeshed with a set of teeth outwardly extending from said rim.

7. A door lock mechanism for use in an automotive vehicle, said door lock mechanism comprising:

- a housing having an opening;
- a moveable latch accessible from said opening of said housing;
- a drive transmission disposed within said housing operably driving said latch;
- a stress dissipation rotatable member located within said drive transmission, said stress dissipation rotatable member including a rim and a hub, at least a first structure inwardly projecting from said rim, at least a second structure outwardly projecting from said hub, a deformable member located between said structures, said rim being movable substantially independent from said hub;
- a first set of gear teeth mounted to said stress dissipation member movable concurrent with said rim; and
- a second set of gear teeth mounted to said stress dissipation member offset from said first set of teeth, said second set of teeth being movable concurrent with said hub;
- said stress dissipation rotatable member operably reducing sudden movement stresses within said drive transmission.

8. The door lock mechanism of claim 7 wherein said latch moves in a linear manner.

9. The door lock mechanism of claim 8 further comprising:

- a pinion gear rotatably coupled to said stress dissipation rotatable member;
- a rack enmeshing with said pinion gear, said rack being coupled to said latch.

10. The door lock mechanism of claim 9 wherein said rack is coupled to said latch in a lost motion manner whereby said rack is linearly moveable a predetermined distance prior to coincidental movement of said latch.

11. The door lock mechanism of claim 7 wherein said stress dissipation rotatable member includes resilient means for allowing rotation al movement differences between a rim and a hub.

12. The door lock mechanism of claim 7 wherein said first structure is a nodule integrally formed as part of said rim, and said deformable member is an elastomeric member located in part between ends of at least three of said nodules and said hub.

13. The door lock mechanism of claim 7 wherein a periphery of said rim is toothless.

14. The door lock mechanism of claim 7 wherein said first and second sets of gear teeth are coaxially aligned with said rim and hub, said sets of gear teeth having different outer diameters.

15. A door lock mechanism for use in an automotive vehicle, said door lock mechanism comprising:

- a housing having an opening;
- a linearly moveable latch accessible from said opening of said housing;
- a drive transmission disposed within said housing operably driving said latch;
- a stress dissipation rotatable member located within said drive transmission, an anti-buckling plate attached to said stress dissipation rotatable member, said stress dissipation rotatable member operably reducing sudden movement stresses within said drive transmission; and
- a pinion gear rotatably coupled to said stress dissipation rotatable member;
- a rack enmeshing with said pinion gear, said rack being coupled to said latch in a lost motion manner whereby said rack is linear moveable a predetermined distance prior to coincidental movement of said latch.

16. The door lock mechanism of claim 15 wherein said stress dissipation rotatable member includes resilient means for allowing some rotational movement differences between a rim and a hub, said resilient means being transversely offset from said anti-buckling plate.

17. The door lock mechanism of claim 16 wherein said resilient means further includes:

- a first set of nodules inwardly extending from said rim;
- a second set of nodules outwardly extending from said hub;
- a second anti-buckling plate; and
- an elastomeric member disposed between said sets of nodules and between said anti-buckling plates.

18. The door lock mechanism of claim 15 further comprising a dc electric motor mounted to said housing and operably driving said drive transmission.

* * * * *

UNITED STATES PATENT AND TRADEMARK OFFICE
CERTIFICATE OF CORRECTION

PATENT NO. : 5,956,998
DATED : September 28, 1999
INVENTOR(S) : Paul J. Fenelon

It is certified that error appears in the above-identified patent and that said Letters Patent is hereby corrected as shown below:

On the Title Page under Other Publications, line 3
(Information Disclosure Citation attached to Office Action dated 1/4/99; sheet 1 of 20 under Other Documents, line 4);
delete "le;.5Q".

Column 18, Line 14 after the Table; (Application Page 32, lines 1-9); insert
-- Gear No. 1 - A conventional arrangement as listed in Table 1.
Gear No. 2 - A solid hub, web, and rim arrangement (as shown in Figure 46) with the pinion gear size increased and the motor horsepower reduced.
Gear No. 5 - The present invention as listed in Table 1 and shown in Figures 40-42.
Gear Nos. 3, 4, 5, 6 - The present invention with a gear having a hollow hub with annular spacing as shown in Figures 40-42.
*Approximate Speed  **Note all gear teeth have identical size and shape --.

Column 21, Line 48; Claim 11;

"rotation al" should be -- rotational --.

Signed and Sealed this

Thirty-first Day of October, 2000

Attest:

Q. TODD DICKINSON

Attesting Officer

Director of Patents and Trademarks